United States Patent
Hamilton et al.

(10) Patent No.: US 11,727,167 B2
(45) Date of Patent: Aug. 15, 2023

(54) CONVEYANCE MODELING

(71) Applicant: Impact Selector International, LLC, Houma, LA (US)

(72) Inventors: Fraser Hamilton, Dubai (AE); Jason Allen Hradecky, Heath, TX (US)

(73) Assignee: Impact Selector International, LLC, Heath, TX (US)

( * ) Notice: Subject to any disclaimer, the term of this patent is extended or adjusted under 35 U.S.C. 154(b) by 231 days.

(21) Appl. No.: 15/733,315

(22) PCT Filed: Dec. 28, 2018

(86) PCT No.: PCT/US2018/067956
§ 371 (c)(1),
(2) Date: Jun. 24, 2020

(87) PCT Pub. No.: WO2019/133873
PCT Pub. Date: Jul. 4, 2019

(65) Prior Publication Data
US 2020/0320232 A1 Oct. 8, 2020

Related U.S. Application Data

(60) Provisional application No. 62/611,120, filed on Dec. 28, 2017.

(51) Int. Cl.
*G06F 30/20* (2020.01)
*E21B 47/07* (2012.01)
(Continued)

(52) U.S. Cl.
CPC ............ *G06F 30/20* (2020.01); *E21B 31/107* (2013.01); *E21B 47/00* (2013.01); *E21B 47/06* (2013.01);
(Continued)

(58) Field of Classification Search
CPC ...... G06F 30/20; G06F 30/27; G06F 2113/08; E21B 47/07; E21B 31/107; E21B 47/00; E21B 47/06; E21B 2200/20
(Continued)

(56) References Cited

U.S. PATENT DOCUMENTS 5,062,048 A * 10/1991 Coulter .................... G01B 7/26
702/6
2013/0124166 A1 * 5/2013 Clemens ................. E21B 44/00
703/2

(Continued)

FOREIGN PATENT DOCUMENTS

CA 2235134 A1 * 5/1997 ............. E21B 47/00
CN 107169220 A * 9/2017 ............. G06F 17/50
(Continued)

OTHER PUBLICATIONS

Ctes et al., "Cerberus User Guide", Version 11.5, Mar. 30, 2014 (Year: 2014).*

(Continued)

*Primary Examiner* — Brian S Cook
(74) *Attorney, Agent, or Firm* — Boisbrun Hofman, PLLC

(57) ABSTRACT

A conveyance model for predicting an output in response to an input, wherein: the input comprises one or more of a wireline input, a toolstring input, a well input, and/or a conveyance input; and the output comprises one or more of a surface weight versus depth output, a cable head tension versus depth output, and a jarring effect output.

23 Claims, 12 Drawing Sheets

(51) Int. Cl.
 *E21B 31/107* (2006.01)
 *E21B 47/00* (2012.01)
 *E21B 47/06* (2012.01)
 *G06F 113/08* (2020.01)

(52) U.S. Cl.
 CPC .......... *E21B 47/07* (2020.05); *E21B 2200/20* (2020.05); *G06F 2113/08* (2020.01)

(58) Field of Classification Search
 USPC .......................................................... 703/10
 See application file for complete search history.

(56) References Cited

U.S. PATENT DOCUMENTS

2014/0277752 A1* 9/2014 Chang ...................... E21B 44/00 700/275
2016/0356125 A1* 12/2016 Bello ................... G06Q 10/067

FOREIGN PATENT DOCUMENTS

FR 3027339 A1 * 4/2016 ............. E21B 44/00
WO WO-2016043760 A1 * 3/2016 ............. E21B 23/08
WO 2019/133873 A1 7/2019

OTHER PUBLICATIONS

Ctes et al, Cerberus User Guide , Mar. 30, 2014 (Mar. 30, 2014), Retrieved from the Internet: URL:http://www.google.com/url?sa=i&rct=j&q=&esrc=s&source=images&cd=&ved=&url=https%3A%2F%2Fapps.nov.com%2FGetDocument%2FgetDocument.aspx%3Fitemid%3DCERBERUS115-MAN%26dstype%3DPDF%26dsname%3DCERBERUS115-MAN&psig=AOvVaw1ThHOxlZpr02wD1Wvw6hS-&ust=1554556501966932, XP055578039 [retrieved on Apr. 5, 2019] pp. 1-23, 72-98, 113-119, 123, 131, 133, 158, 298, 344, and 448-451.
H C Castillo et al, "Effective application of an innovative conveyance-risk management methodology to reduce well-intervention cost and risks in long/tortuous wells", Mar. 21, 2007 (Mar. 21, 2007), p. 1-15, Retrieved from the Internet: URL:https://www.onepetro.org/download/conference-paper/SPE-106562-MS?id=conference-paper%2FSPE-106562-MS, XP055578245. [retrieved on Apr. 5, 2019] p. 4-p. 7; figures 6-8. (15 pages).
H Castillo et al, "Modern Wireline Forces Modeling Using High-Impact Supplementary Utilities", Mar. 25, 2015 (Mar. 25, 2015), p. 1-31, Retrieved from the Internet: URL:https://www.onepetro.org/conference-paper/SPE-173669-MS?event-fire=false. XP055578100 [retrieved on Apr. 5, 2019]. figures 1a-b, 6-7. (32 pages).
India Application No. 202047027311; First Examination Report dated Apr. 23, 2021, 6 pages.
PCT/US2018/067956 Written Opinion/International Search Report dated Apr. 16, 2019, 11 pages.

* cited by examiner

CONVEYANCE MODELING

CROSS REFERENCE TO RELATED APPLICATION

This application claims priority to and the benefit of U.S. Provisional Application No. 62/611,120, titled "CONVEYANCE MODELING," filed Dec. 28, 2017, the entire disclosures of which are hereby incorporated herein by reference.

BACKGROUND OF THE DISCLOSURE

Drilling operations have become increasingly expensive as the need to drill deeper, in harsher environments, and through more difficult materials has become a reality. In addition, testing and evaluation of completed and partially finished wellbores has become commonplace, such as to increase well production and return on investment. Consequently, in working with deeper and more complex wellbores, it becomes more likely that tools, tool strings, and/or other downhole equipment may become stuck within the wellbore.

A downhole tool, often referred to as a jarring tool, may be operable to dislodge the downhole equipment when it becomes stuck. The jarring tool may be included as part of the tool string and deployed downhole along with the downhole equipment, or the jarring tool may be deployed downhole to free the downhole equipment after it becomes stuck. Tension may be applied to the deployed tool string via a conveyance means to trigger the jarring tool and, thus, deliver an impact intended to dislodge the stuck downhole equipment.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
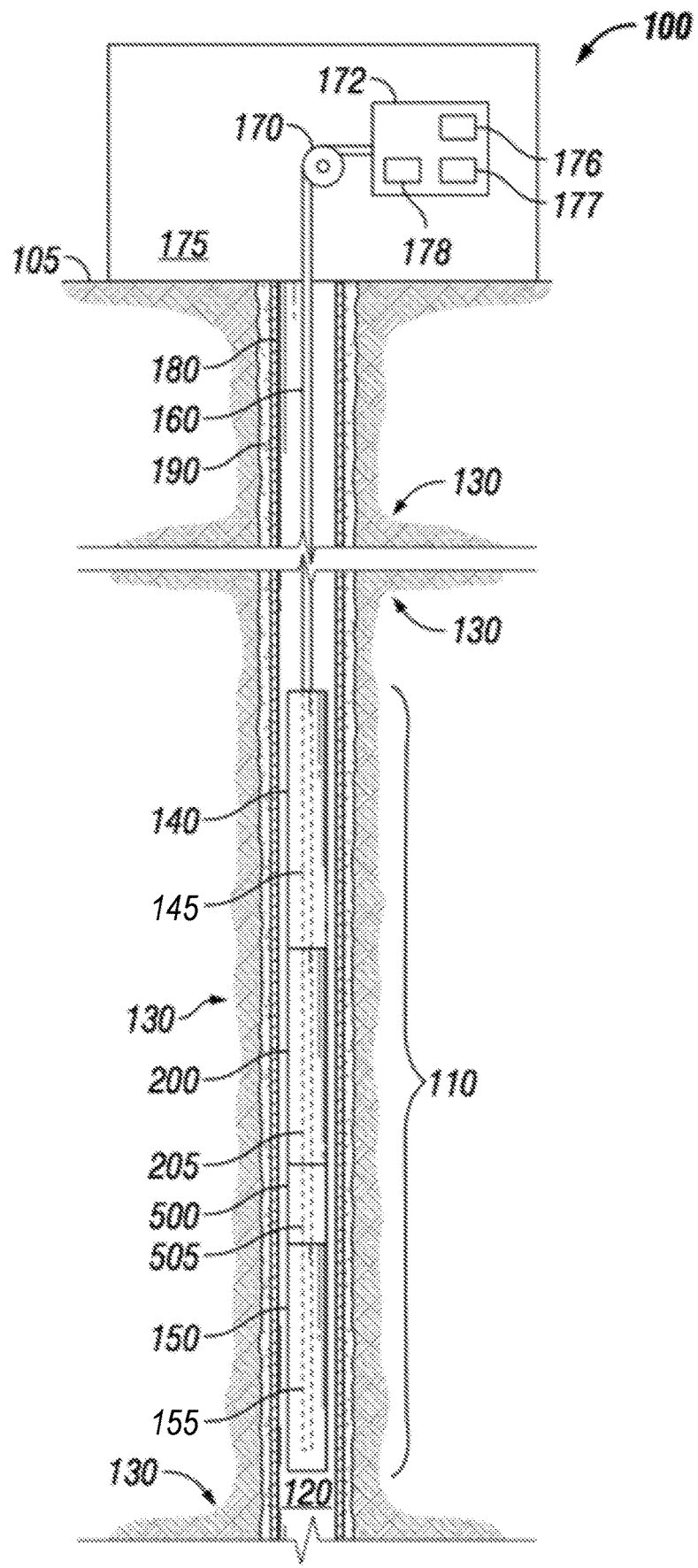
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of a wellsite system 100 according to one or more aspects of the present disclosure. The wellsite system 100 may comprise a tool string 110 suspended within a wellbore 120 that extends from a wellsite surface 105 into one or more subterranean formations 130. The wellbore 120 is depicted as being a cased-hole implementation comprising a casing 180 secured by cement 190. However, one or more aspects of the present disclosure are also applicable to and/or readily adaptable for utilizing in open-hole implementations lacking the casing 180 and cement 190. The tool string 110 may be suspended within the wellbore 120 via conveyance means 160 operably coupled with a tensioning device 170 and/or other surface equipment 175 disposed at the wellsite surface 105, including a power and control system 172. The tool string 110 may comprise a first portion 140, a second portion 150, and a jarring tool 200 coupled between the first portion 140 and the second portion 150. The tool string 110 may further comprise a sensor tool 500 coupled between the jarring tool 200 and the second portion 150. However, as described below, the sensor tool 500 may be coupled at another location within the tool string 110, such as between the jarring tool 200 and the first portion 140.

The jarring tool 200 and the sensor tool 500 are each implemented as single downhole tools. In the context of the present disclosure, a "single downhole tool" may be that which includes no more than two interfaces that are capable of being operably coupled or "made-up" with other downhole tools to form the tool string 110. Thus, coupling the jarring tool 200 with the sensor tool 500 does not result in a "single downhole tool" because such assembly would have four interfaces that are capable of being coupled with other downhole tools to form the tool string 110—namely, the two interfaces of the jarring tool 200 and the two interfaces of the sensor tool 500. Accordingly, assembling the jarring tool 200 with the sensor tool 500 results in two downhole tools instead of a "single downhole tool."

The tensioning device 170 is operable to apply an adjustable tensile force to the tool string 110 via the conveyance means 160. The tensioning device 170 may be, comprise, or form at least a portion of a crane, winch, drawworks, top drive, and/or other lifting device coupled to the tool string 110 by the conveyance means 160. The conveyance means 160 may be or comprise a wireline, slickline, e-line, coiled tubing, drill pipe, production tubing, and/or other conveyance means, and may comprise and/or be operable in conjunction with means for communication between the tool string 110, the tensioning device 170, and/or one or more other portions of the surface equipment 175, including the power and control system 172. The conveyance means 160 may comprise a multi-conductor wireline and/or other electrical conductor(s) extending between the tool string 110 and the surface equipment 175. The power and control system 172 may include a source of electrical power 176, a memory device 177, and a controller 178 operable to receive and process electrical signals from the tool string 110 and/or commands from a surface operator.

The first and second portions 140, 150 of the tool string 110 may each be or comprise one or more downhole tools, modules, and/or other apparatus operable in wireline, while-drilling, coiled tubing, completion, production, and/or other implementations. The first portion 140 of the tool string 110 may comprise at least one electrical conductor 145 in electrical communication with at least one component of the surface equipment 175. The second portion 150 of the tool string 110 may also comprise at least one electrical conductor 155, wherein the at least one electrical conductor 145 and the at least one electrical conductor 155 may be in electrical communication via at least one or more electrical conductors 205, 505 of the jarring tool 200 and the sensor tool 500, respectively. One or more of the electrical conductors 145, 155, 205, 505 may connect with and/or form a portion of the conveyance means 160, and may include various electrical connectors and/or interfaces along such path, including as described below.

Each of the electrical conductors 145, 155, 205, 505 and/or others may comprise a plurality of individual conductors, such as may facilitate electrical communication of the first portion 140 of the tool string 110, the jarring tool 200, the sensor tool 500, and the second portion 150 of the tool string 110 with at least one component of the surface equipment 175, such as the power and control system 172. For example, the conveyance means 160 and the electrical conductors 145, 155, 205, 505 may be operable to transmit and/or receive electrical power, data, and/or control signals between the power and control system 172 and one or more of the first portion 140, the jarring tool 200, the sensor tool 500, and the second portion 150. The electrical conductors 145, 155, 205, 505 may further facilitate electrical communication between two or more of the first portion 140, the jarring tool 200, the sensor tool 500, and the second portion 150.

The jarring tool 200 is operable to dislodge a portion of the tool string 110 that has become lodged or stuck within the wellbore 120, such as the second portion 150. Thus, the jarring tool 200 and the sensor tool 500 are coupled into the tool string 110 before the tool string 110 is conveyed into the wellbore.

Figure 2:
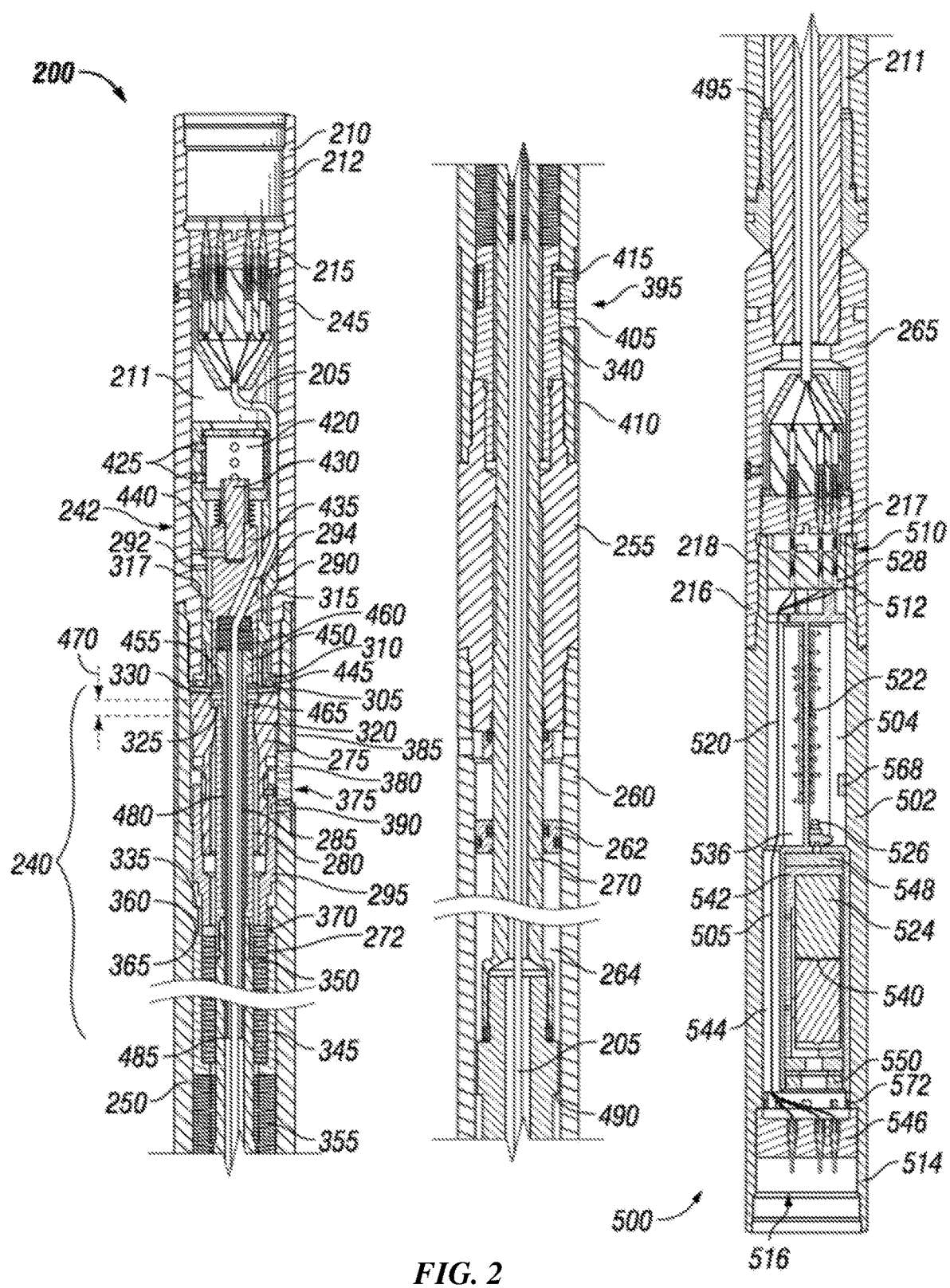
FIG. 2 is a sectional view of an example implementation of a portion of the apparatus shown in FIG. 1 according to one or more aspects of the present disclosure.

FIG. 2 is a sectional view of an example implementation of the jarring tool 200 and the sensor tool 500 shown in FIG. 1 according to one or more aspects of the present disclosure. Referring to FIGS. 1 and 2, collectively, the jarring tool 200 comprises the electrical conductor 205 in electrical communication with the electrical conductor 145 of the first portion 140 of the tool string 110 and in electrical communication with the electrical conductor 505 of the sensor tool 500. The electrical conductor 505 of the sensor tool 500 is in electrical communication with the electrical conductor 155 of the second portion 150 of the tool string 110.

For example, the jarring tool 200 may comprise one or more uphole (hereinafter "upper") electrical connectors 215 and one or more downhole (hereinafter "lower") electrical connectors 217 in electrical communication with the electrical conductor 205 extending therebetween. The upper electrical connector 215 may electrically connect with a corresponding lower electrical connector (not shown) of the first portion 140 of the tool string 110, wherein the lower electrical connector of the first portion 140 may be in electrical connection with the electrical conductor 145. The sensor tool 500 may comprise an upper interface 510 at an upper end of the sensor tool 500 and a lower interface 516 at an opposing lower end of the sensor tool 500. The upper interface 510 may comprise an upper electrical connector 528 and upper mechanical fastening means 512, and the lower interface 516 may comprise a lower electrical connector 546 and lower mechanical fastening means 514. The upper electrical connector 528 and the lower electrical connector 546 may be in electrical connection via the electrical conductor 505 extending therebetween. The lower electrical connector 217 of the jarring tool 200 may electrically connect with the upper electrical connector 528, and the lower electrical connector 546 may electrically connect with a corresponding upper electrical connector (not shown) of the second portion 150, wherein the upper electrical connector of the second portion 150 is in electrical connection with the electrical conductor 155. Accordingly, the electrical conductor 145 of the first portion 140 of the tool string 110 may be in electrical communication with the electrical conductor 155 of the second portion 150 of the tool string 110 via the electrical conductor 205 of the jarring tool 200, the electrical conductor 505 of the sensor tool 500, and one or more electrical connectors 215, 217, 528, 546. Consequently, the electrical conductor 145 of the first portion 140 of the tool string 110, the electrical conductor 205 of the jarring tool 200, the electrical conductor 505 of the sensor tool 500, and the electrical conductor 155 of the second portion 150 of the tool string 110, including via one or more additional electrical connectors 215, 217, 528, 546, may be in electrical communication with the surface equipment 175, such as via the conveyance means 160.

The jarring tool 200 and/or associated apparatus may be operable to detect an electrical characteristic of the electrical conductor 205, impart a first impact force on the second portion 150 of the tool string 110 when the electrical characteristic is detected, and impart a second impact force on the second portion 150 of the tool string 110 when the electrical characteristic is not detected. The second impact force may be substantially greater than or otherwise different from the first impact force. For example, the first impact force may be about 3,500 pounds (or about 15.6 kilonewtons), whereas the second impact force may be about 9,000 pounds (or about 40.0 kilonewtons). However, other quantities are also within the scope of the present disclosure. For example, the first impact force may range between about 1,000 pounds (or about 4.4 kilonewtons) and about 6,000 pounds (or about 26.7 kilonewtons), and the second impact force may range between about 6,000 pounds (or about 26.7 kilonewtons) and about 12,000 pounds (or about 53.4 kilonewtons). A difference between the first and second impact forces may range between about 1,000 pounds (or about 4.4 kilonewtons) and about 6,000 pounds (or about 26.7 kilonewtons), although other differences are also within the scope of the present disclosure.

The electrical characteristic detected by the jarring tool 200 may be a substantially non-zero voltage and/or current, such as in implementations in which the electrical characteristic is a voltage substantially greater than about 0.01 volts and/or a current substantially greater than about 0.001 amperes. For example, the electrical characteristic may be a voltage substantially greater than about 0.1 volts and/or a current substantially greater than about 0.01 amperes. However, other values are also within the scope of the present disclosure.

As at least partially shown in FIG. 2, the jarring tool 200 may further comprise an upper housing 242, which may include a first upper housing portion 245, a second upper housing portion 250 coupled to the first upper housing portion 245, a connector 255 coupled to the second upper housing portion 250 opposite the first upper housing portion 245, and a third upper housing portion 260 coupled to the connector 255 opposite the second upper housing portion 250. The several portions of the upper housing 242 comprise a central bore 211 extending therethrough, such as may be operable to contain therein the upper electrical connector 215 and other components, as described below.

The jarring tool 200 may further comprise a lower housing 265 coupled to the sensor tool 500, and a shaft 270 extending between the lower housing 265 and the upper housing 242. The shaft 270 may be fixedly coupled with the lower housing 265 and slidably coupled with the upper housing 242, wherein the shaft 270 and the upper housing 242 move axially relative to each other. The shaft 270 extends into the third upper housing portion 260, the connector 255, and the second upper housing portion 250, and terminates at a latching mechanism 240. An upper end 210 of the upper housing 242 includes an interface comprising upper mechanical fastening means 212 for coupling with a corresponding interface of the first portion 140 of the tool string 110. A lower end 216 of the lower housing 265 includes an interface comprising lower mechanical fastening means 218 for coupling with an interface comprising upper mechanical fastening means 512 of a housing 502 of the sensor tool 500. The upper and lower mechanical fastening means 212, 218 may comprise internal or external threads, one or more fasteners, box-pin couplings, other oil field component field joints and/or coupling means, and/or other means known in the art.

The latching mechanism 240 may comprise a female latch portion 275, a male latch portion 280, and an anti-release member 285. The female latch portion 275 may be slidably retained within the second upper housing portion 250 between a detector housing 290 and at least a portion of an upper adjuster 295. A floating separator 305 may be disposed between the female latch portion 275 and the detector housing 290. In the depicted implementation, the separator 305 is a Belleville washer retained between the female latch portion 275 and a lock ring 310. The lock ring 310 may be threadedly engaged with the detector housing 290 to retain mating engagement between corresponding conical or otherwise tapered mating surfaces 315 external to the detector housing 290 with corresponding conical or otherwise tapered mating surfaces 317 internal to the first upper housing portion 245, thus positionally fixing the detector housing 290 relative to the first upper housing portion 245.

The male latch portion 280 comprises a plurality of flexible members 320 collectively operable to detachably engage the female latch portion 275. While only two instances are visible in the figures, a person having ordinary skill in the art will readily recognize that more than two instances of the flexible member 320 collectively encircle the anti-release member 285. The male latch portion 280 is coupled to or otherwise carried with the shaft 270, such as via threaded means, fasteners, pins, press/interference fit, and/or other coupling 272. Thus, the female latch portion 275 is carried with and/or by the upper housing 242 and, thus, the first or upper portion 140 of the tool string 110, whereas the male latch portion 280 is carried with and/or by the lower housing 265 and, thus, the sensor tool 500 and the second or lower portion 150 of the tool string 110. The detachable engagement between the female and male latch portions 275, 280 is between an internal profile 325 of the female latch portion 275 and an external profile 330 of each of the plurality of flexible members 320.

The anti-release member 285 is moveable within the male latch portion 280 between a first position, defining a first configuration of latching mechanism 240, shown in FIG. 2, corresponding to when the jarring tool 200 detects the electrical characteristic on the electrical conductor 205, and a second position (not shown), defining a second configuration of the latching mechanism 240, wherein the external profile 330 is disengaged from and disposed below the internal profile 325, corresponding to when the jarring tool 200 does not detect (or detects the absence of) the electrical characteristic on the electrical conductor 205. The anti-release member 285 prevents radially inward deflection of the plurality of flexible members 320 and, thus, disengagement of the female and male latch portions 275, 280 when the tensile force applied across the latching mechanism 240 is substantially less than the first impact force when the anti-release member 285 is in the first position, and substantially less than the second impact force when the anti-release member 285 is moved downwards to the second position. Such operation is described in greater detail below.

The upper adjuster 295 is threadedly engaged with the female latch portion 275, such that the upper adjuster 295 and the female latch portion 275 float axially between, for example, the lock ring 310 and an internal shoulder 335 of the second upper housing portion 250, and such that rotation of the female latch portion 275 relative to the upper adjuster 295 adjusts the relative axial positions of the female latch portion 275 and the upper adjuster 295. The jarring tool 200 also comprises a lower adjuster 340 disposed within the second upper housing portion 250 and threadedly engaged with the connector 255, such that the axial position of the lower adjuster 340 is adjustable in response to rotation of the lower adjuster 340 relative to the connector 255 and/or the second upper housing portion 250. The jarring tool 200 also comprises a carrier 345 slidably retained within the second upper housing portion 250, an upper spring stack 350 slidably disposed within the annulus defined within the carrier 345 by the shaft 270 and/or the male latch portion 280, and a lower spring stack 355 slidably retained between the carrier 345 and the lower adjuster 340. The upper and lower spring stacks 350, 355 may each comprise one or more Belleville washers, wave springs, compression springs, and/or other biasing members operable to resist contraction in an axial direction.

The lower spring stack 355 biases the carrier 345 away from the lower adjuster 340 in an upper direction, ultimately urging an upper-facing shoulder 360 of the carrier 345 towards contact with a corresponding, downhole-facing, interior shoulder 365 of the second upper housing portion 250. The upper spring stack 350 biases the upper adjuster 295 away from the carrier 345 (perhaps via one or more contact rings, washers, and/or other annular members 370), thus urging the interior profile 325 of the female latching portion 275 into contact with the exterior profile 330 of the plurality of flexible members 320, when the anti-release member 285 is positioned within the ends of the flexible members 320. The upper spring stack 350 also urges the female latching portion 275 (via the adjuster 295) towards contact with the separator 305, when permitted by engagement between the female and male latch portions 275, 280.

Thus, as explained in greater detail below: (1) the lower adjuster 340 is disposed in the second upper housing portion 250 at an axial location that is adjustable relative to the second upper housing portion 250 in response to rotation of the lower adjuster 340 relative to the second upper housing portion 250, (2) the upper spring stack 350 is operable to resist relative movement (and thus disengagement) of the female and male latch portions 275, 280, and (3) the lower spring stack 355 is also operable to resist relative movement (and thus disengagement) of the female and male latch portions 275, 280, wherein: (A) the female latch portion 275 is axially fixed relative to the second upper housing portion 250, (B) the male latch portion 280 is axially fixed relative to the second upper housing portion 250, (C) the difference between a first magnitude of the first impact force and a second magnitude of the second impact force is adjustable via adjustment of the relative locations of the female latch portion 275 and the upper adjuster 295 in response to relative rotation of the female latch portion 275 and the upper adjuster 295, and (D) the second magnitude of the second impact force is adjustable in response to adjustment of the location of the lower, "static" end of the lower spring stack 355 relative to the second upper housing portion 250, which is accomplished by adjusting the location of the lower adjuster 340 via rotation relative to the second upper housing portion 250 and/or connector 255.

Rotation of the female latch portion 275 relative to the second upper housing portion 250 may be via external access through an upper window 375 extending through a sidewall of the second upper housing portion 250. The upper window 375 may be closed during operations via one or more of: a removable member 380 sized for receipt within the window 375; and a rotatable cover 385 having an opening (not numbered) that reveals the window 375 when rotationally aligned to do so but that is also rotatable away from the window 375 such that the cover 385 obstructs access to the window 375. A fastener 390 may prevent rotation of the cover 385 during operations.

Rotation of the lower adjuster 340 relative to the second upper housing portion 250 may be via external access through a lower window 395 extending through a sidewall of the second upper housing portion 250. The lower window 395 may be closed during operations via one or more of: a removable member 405 sized for receipt within the window 395; and a rotatable cover 410 having an opening (not numbered) that reveals the window 395 when rotationally aligned to do so but that is also rotatable away from the window 395 such that the cover 410 obstructs access to the window 395. A fastener 415 may prevent rotation of the cover 410 during operations.

The detector housing 290 contains, for example, a detector 420 operable to detect the electrical characteristic based upon which the higher or lower impact force is imparted by the jarring tool 200 to the second tool string portion 150 (via the sensor tool 500). For example, as described above, the detector 420 may be operable to detect the presence of current and/or voltage on the electrical conductor 205, such as in implementations in which the detector is and/or comprises a transformer, a Hall effect sensor, a Faraday sensor, a magnetometer, and/or other devices operable in the detection of current and/or voltage. The detector 420 may be secured within the detector housing 290 by one or more threaded fasteners, pins, and/or other means 425.

The detector 420 also is, comprises, and/or operates in conjunction with a solenoid, transducer, and/or other type of actuator operable to move the anti-release member 285 between the first position (shown in FIG. 2) and the second position (not shown), below the first position, based on whether the electrical characteristic sensor of the detector 420 detects the electrical characteristic. In the example implementation depicted in FIG. 2, such actuator comprises a plunger 430 extending from the detector 420 and coupled to a mandrel 435 that slides axially with the plunger 430 inside the detector housing 290. The plunger 430 and mandrel 435 may be coupled via one or more threaded fasteners, pins, and/or other means 440, which may slide within a slot 292 extending through a sidewall of the detector housing 290. The mandrel 435 includes a recess 445 within which a retaining ring and/or other means 455 retains a head 450 of the anti-release member 285. A spring and/or other biasing member 460 disposed within the recess 445 urges the head 450 of the anti-release member 285 towards the retaining means 455 and/or otherwise resists upward movement of the anti-release member 285 relative to the mandrel 435.

The detector housing 290 and the mandrel 435 may each comprise one or more passages 294 through which the electrical conductor 205 may pass and then extend through the anti-release member 285 and the shaft 270. Accordingly, the electrical conductor 205 may be in electrical communication with the electrical conductors 505, 155 of the sensor tool 500 and the second tool string portion 150, respectively.

The anti-release member 285 may comprise multiple sections of different diameters. For example, the head 450 of the anti-release member 285 may have a diameter sized for receipt within the recess 445 of the mandrel 435 and containment therein via the retaining means 455. For example, a blocking section 465 of the anti-release member 285 may have a diameter sized for receipt within the male latch portion 280 (e.g., within the plurality of flexible members 320), such that the anti-release member 285 prevents disengagement of the female and male latch portions 275, 280 when the blocking section 465 is positioned within the male latch portion 280. For example, the blocking section 465 of the anti-release member 285 may be sufficiently sized and/or otherwise configured such that, when positioned within the ends of the plurality of flexible members 320, the flexible members 320 are prevented from deflecting radially inward in response to contact between the inner profile 325 of the female latch portion 275 and the outer profile 330 of each of the flexible members 320 of the male latch portion 280.

The detector 420, the plunger 430, the mandrel 435, and the biasing member 460 may also cooperatively operate to axially translate the anti-release member 285 between its first and second positions described above. For example, in the example implementation and operational stage depicted in FIG. 2, the blocking section 465 of the anti-release member 285 is positioned in the first position, including within the flexible members 320 of the male latch portion 280, such that the blocking section 465 of the anti-release member 285 prevents the radially inward deflection of the flexible members 320, and thus prevents the disengagement of the female and male latch portions 275, 280 until the tensile force applied across the jarring tool 200 sufficiently overcomes the biasing force(s) of the upper and/or lower spring stacks 350, 355. That is, to disengage the female and male latch portions 275, 280, the tensile force applied across the jarring tool 200 is increased by an amount sufficient to cause relative translation between the blocking section 465 of the anti-release member 285 and the male latch portion 280 by at least a distance 470 sufficient to remove the blocking section 465 of the anti-release member 285 from the ends of the flexible members 320 of the male latch portion 280, thereby permitting the radially inward deflection of the ends of the flexible members 320 and, thus, their disengagement from the female latch portion 275.

In the example implementation depicted in FIG. 2, the distance 470 is about 0.5 inches (or about 1.3 centimeters). However, the distance 470 may range between about 0.2 inches (or about 0.8 centimeters) and about 2.0 inches (or about 5.1 centimeters) within the scope of the present disclosure, and may also fall outside such range while nonetheless remaining within the scope of the present disclosure.

In another implementation and/or operational stage, the detector 420, the plunger 430, the mandrel 435, and/or the biasing member 460 may cooperatively translate the anti-release member 285 to its second position, such as in response to the detector 420 detecting a current, voltage, and/or other electrical characteristic of the electrical conductor 205. Consequently, the blocking section 465 of the anti-release member 285 may be positioned further inside (i.e., further downward) the male latch portion 280 relative to the first configuration depicted in the implementation/operational stage shown in FIG. 2. Accordingly, the distance 470 may be increased due to relative axial translation between the blocking section 465 and the ends of the flexible members 320 of the male latch portion 280. For example, the distance 470 may increase to about 0.8 inches (or about 2.0 centimeters). However, the increased distance 470 may range between about 0.3 inches (or about 0.8 centimeters) and about 4.0 inches (or about 10.1 centimeters) within the scope of the present disclosure, and may also fall outside such range while nonetheless remaining within the scope of the present disclosure.

As described above, the detector 420, the plunger 430, the mandrel 435, and/or the biasing member 460 may be collectively operable to move the blocking section 465 of the anti-release member 285 from the first position to (or at least towards) the second position. However, the detector 420, the plunger 430, the mandrel 435, and/or the biasing member 460 may also be collectively operable to return the blocking section 465 of the anti-release member 285 from the second position to (or at least towards) the first position. To facilitate such movement, the anti-release member 285 may also comprise an aligning section 480 having a diameter at least small enough to permit sufficient radially inward deflection of the ends of the flexible members 320, such as to consequently permit disengagement of the female and male latch portions 275, 280. The length of the aligning section 480 may vary within the scope of the present disclosure, but may generally be long enough that the end 485 of the anti-release member 285 remains within the male latch portion 280 and/or the shaft 270 during operation of the jarring tool 200.

The detector 420, the plunger 430, the mandrel 435, and/or the biasing member 460 may also be collectively operable to move the blocking section 465 of the anti-release member 285 to a third position between the first position and the second position. For example, the detector 420 may be operable to measure a quantitative value of the electrical characteristic of the electrical conductor 205, instead of (or in addition to) merely detecting the presence or absence of the electrical characteristic. Consequently, the extent to which the detector 420, the plunger 430, the mandrel 435, and/or the biasing member 460 collectively operate to move the blocking section 465 may be based on the measured quantitative value of the electrical characteristic of the electrical conductor 205. For example, the detector 420, the plunger 430, the mandrel 435, and/or the biasing member 460 may collectively operate to position the blocking section 465 of the anti-release member 285 in: (1) the first position when the electrical characteristic of the electrical conductor 205 measured by the detector 420 is greater than a first predetermined level (e.g., a first predetermined current and/or voltage), (2) the second position when the electrical characteristic of the electrical conductor 205 measured by the detector 420 is zero or less than a second predetermined level (e.g., a second predetermined current and/or voltage), and (3) a third position between the first and second positions. The third position may be a single predetermined position between to the first and second positions, or may be one of multiple predetermined positions each corresponding to a quantitative interval between the first and second predetermined levels.

The detector 420, the plunger 430, the mandrel 435, and/or the biasing member 460 may also or instead collectively operate to position the blocking section 465 of the anti-release member 285 at a third position offset between the first and second positions by an amount proportional to the difference between the measured electrical characteristic and the first and second predetermined levels. For example, if the first predetermined level is ten (10) units (e.g., volts or amperes), the second predetermined level is zero (0) units, the measured electrical characteristic is three (3) units, and the distance between the first and second positions is about ten (10) centimeters, then the third position may be about three (3) centimeters from the second position, which is also about seven (7) centimeters from the first position.

FIG. 2 also depicts a floating piston 262 disposed within the annulus 264 defined between the outer profile of the shaft 270 and the inner profile of the third upper housing portion 260. The floating piston 262 may fluidly isolate a lower portion of annulus 264 below the floating piston 262 from an upper portion of the annulus 264. At least a portion of the annulus 264 may thus be utilized for pressure compensation of wellbore fluid and/or hydraulic oil contained within the jarring tool 200.

Figure 3:
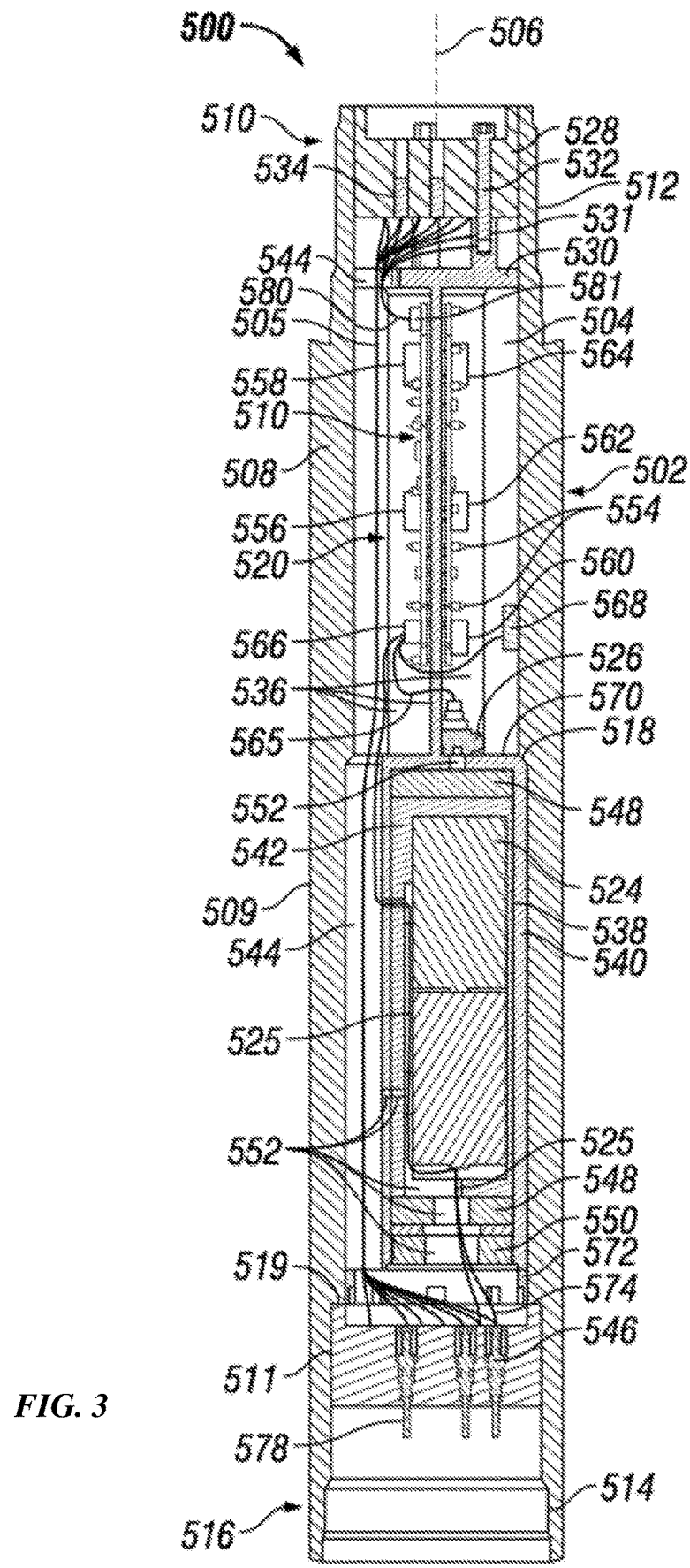
FIG. 3 is a sectional view of a portion of the apparatus shown in FIG. 2.
Figure 4:
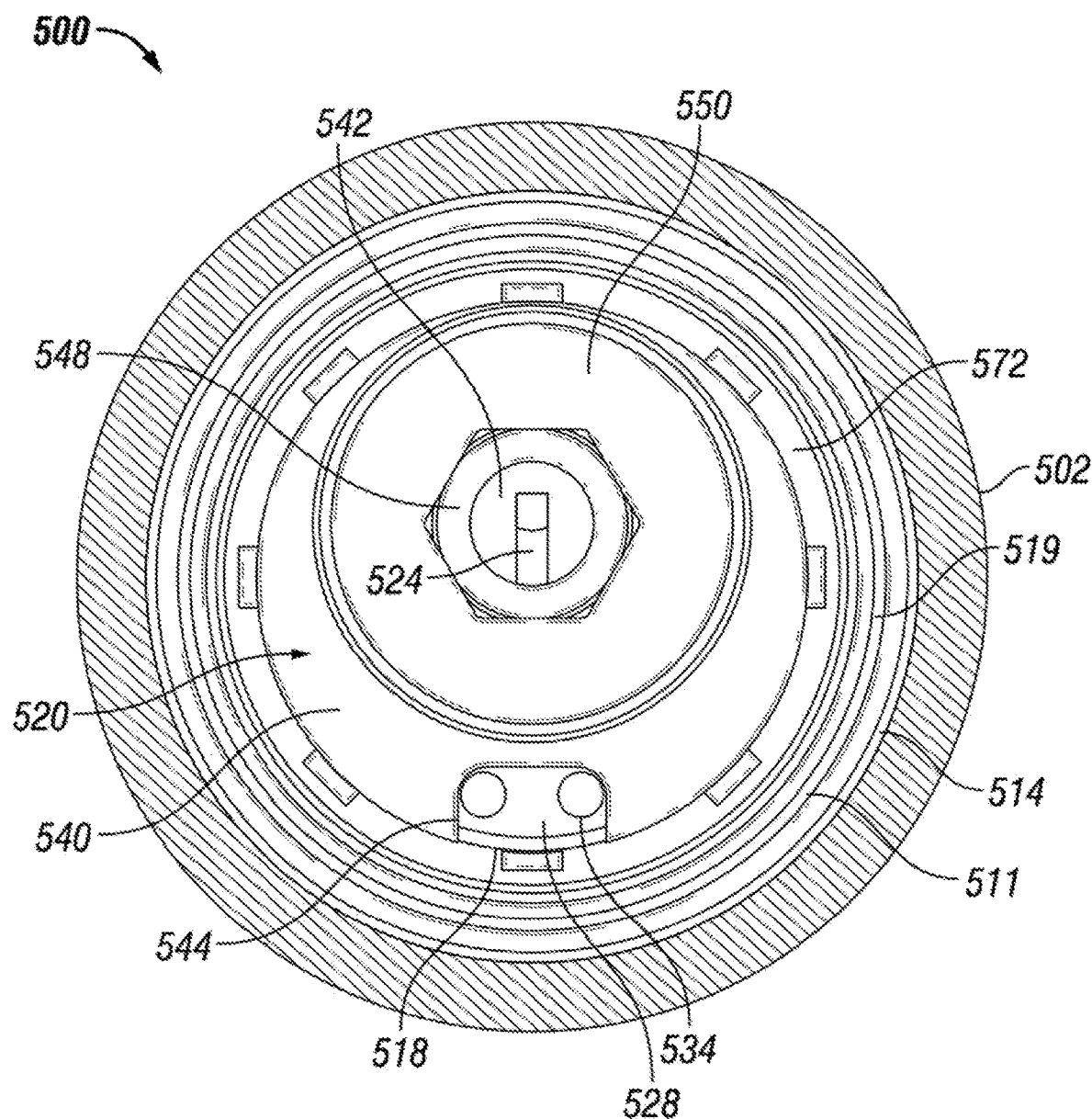
FIG. 4 is a bottom view of the apparatus shown in FIG. 3.

FIG. 3 is a sectional view of an example implementation of the sensor tool 500 shown in FIGS. 1 and 2 according to one or more aspects of the present disclosure. FIG. 4 is a bottom view of the sensor tool 500 shown in FIG. 3. For simplicity and clarity, FIG. 4 omits the lower electrical connector 546 to facilitate an improved view of some portions of the sensor tool 500.

Referring to FIGS. 1-4, collectively, the housing 502 of the sensor tool 500 may have a substantially tubular configuration. The housing 502 may comprise a first inner surface 508, a second inner surface 509, and a third inner surface 511 collectively defining a substantially cylindrical bore 504 (or multiple contiguous bores) extending longitudinally through the housing 502 along a central axis 506 of the sensor tool 500. The second inner surface 509 may comprise an inner diameter that is larger than an inner diameter of the first inner surface 508, and the third inner surface 511 may comprise an inner diameter that is larger than the inner diameter of the second inner surface 509. The housing 502 may further comprise a first shoulder 518 at the transition between the first inner surface 508 and the second inner surface 509, and a second shoulder 519 at the transition between the second inner surface 509 and the third inner surface 511. The first shoulder 518 may protrude radially into the bore 504 from the second inner surface 509 and extend circumferentially between the first and second inner surfaces 508, 509. The second shoulder 519 may protrude radially into the bore 504 from the third inner surface 511 and extend circumferentially between the second and third inner surfaces 509, 511.

The upper mechanical fastening means 512, located at the upper interface of the housing 502, may be operable to couple the sensor tool 500 with the lower mechanical fastening means 218 of the lower interface of the lower housing 265 of the jarring tool 200 or with another portion of the tool string 110. Although the upper mechanical fastening means 512 is shown as an external thread engaging the lower mechanical fastening means 218 of the jarring tool 200, other implementations of the upper mechanical fastening means 512 may include one or more fasteners, box-pin couplings, other oil field component field joints and/or coupling means, and/or other mechanical fastening means and/or interfaces known in the art. The lower mechanical fastening means 514, located at the lower interface of the housing 502, may be operable to couple the sensor tool 500 with the second portion 150 of the tool string 110 or with another portion of the tool string 110. Although the lower mechanical fastening means 514 is shown as an internal thread operable to threadedly engage a corresponding external thread (not shown), other implementations of the lower mechanical fastening means 514 may include one or more fasteners, box-pin couplings, other oil field component field joints and/or coupling means, and/or other mechanical fastening means and/or interfaces known in the art.

The sensor tool 500 further comprises an internal framing or support assembly, referred to herein as a chassis 520, to support or maintain one or more electronics boards 522, a power source 524, an accelerometer 526, and an upper electrical connector 528 in corresponding predetermined positions within the bore 504 of the housing 502. For example, an upper end of the chassis 520 may comprise a support member 530 that may aid in maintaining at least a portion of the chassis 520 centralized within the central bore 504 of the housing 502. The support member 530 may also function as a mounting bracket or surface, such as may maintain the upper electrical connector 528 in a predetermined position at or near the upper interface of the sensor tool 500. The support member 530 may comprise a plate or another member having a substantially cylindrical shape or otherwise have a curved outer surface that may facilitate contact with the cooperatively curved first inner surface 508 of the housing 502. The support member 530 may comprise an outer diameter that is sufficiently smaller than the inner diameter of the first inner surface 508 so as to permit the support member 530 to axially move within a corresponding portion of the bore 504 while minimizing radial movement within the corresponding portion of the bore 504. The support member 530 may comprise one or more threaded ports 531 for receiving one or more threaded bolts 532 to fixedly couple the upper electrical connector 528 to the support member 530 and, thus, in a predetermined position relative to the upper mechanical fastening means 512 of the upper interface.

The upper electrical connector 528 may comprise a plurality of sockets 534 electrically connected with the plurality of individual conductors of the electrical conductor 505. The plurality of sockets 535 may receive therein a plurality of pins from the upper or lower electrical connectors 212, 217 of the jarring tool 200, or from another portion of the tool string 110. Although one implementation of the upper electrical connector 528 is shown, the upper electrical connector 528 may be or comprise other electrical connectors known in the art, such as may be operable to mate or otherwise electrically connect with the electrical connectors 215, 217 of the jarring tool 200, the lower electrical connector (not shown) of the first portion 140, or an electrical connector of another portion of the tool string 110. In another implementation of the sensor tool 500, the upper electrical connector 528 may be omitted, wherein the individual conductors of the electrical conductor 505 may be spliced or otherwise connected with individual conductors of the electrical conductor 205 of the jarring tool 200 or another electrical conductor.

A lower end of the chassis 520 may comprise a receptacle portion 540 defining an open area or a cavity 538 containing the power source 524 and/or a container 542 containing the power source 524. The cavity 538 may have a substantially cylindrical shape, such as to permit the power source 524 and/or the container 542 to be slidably or otherwise disposed within the cavity 538. The receptacle portion 540 may have a substantially cylindrical shape, with an outer diameter that is sufficiently smaller than the outer diameter of the second inner surface 509 of the housing 502 so as to permit the receptacle portion 540 to axially move within a corresponding portion of the bore 504 while minimizing radial movement within the corresponding portion of the bore 504. An upper end of the receptacle portion 540 may comprise an edge or a shoulder 570, such as may contact the first shoulder 518 of the housing 502. The power source 524 may comprise one or more rechargeable batteries, such as lithium ion batteries, and/or other means known in the art, such as may be operable to store electrical energy for powering components coupled to the electronics boards 522, the accelerometer 526, and/or other electrical components.

One or more damping members 548 may be disposed within the cavity 538 between the receptacle portion 540 and the power source 524 and/or the container 542, such as may aid in damping and/or otherwise reducing shock transmitted to the power source 524 during jarring and other operations. The damping members 548 may comprise rubber, polyether ether ketone (PEEK), and/or other damping material.

The power source 524, the container 542, and the damping members 548 may be retained within the cavity 538 by a fastener 550 operable to engage the receptacle portion 540. The fastener 550 may be or comprise a threaded retaining ring having external threads operable to engage corresponding internal threads of the receptacle portion 540 and, thereby, prevent the power source 524, the container 542, and the damping members 548 from moving out of the cavity 538. One or more of the receptacle portion 540, the container 542, the damping members 548, and the fastener 550 may comprise one or more openings 552 extending therethrough, such as may permit leads, wires, and/or other electrical conductors 525 to extend from the power source 524 and communicate electrical power with at least one of the electronics boards 522, the accelerometer 526, and/or the electrical conductor 505 (such as to recharge the batteries of the power source 524).

Portions of the chassis 520 may further comprise cutout portions or channels 544 extending longitudinally with respect to the central axis 506. Such features 544 may, for example, permit the electrical conductor 505 to extend through the bore 504 between the housing 502 and the chassis 520 from the upper electrical connector 528 to the lower electrical connector 546.

In addition to (or instead of) using the power source 524 as the source of electrical power for the sensor tool 500, electrical power may be provided from the wellsite surface 105 to the sensor tool 500 via the conveyance means 160 and the electrical conductors 145, 205, 505. In such implementations, the sensor tool 500 may further comprise an electrical conductor 580 extending between the electrical conductor 505 and a power and communications interface 581 of at least one of the electronics boards 522. For example, individual wires of the electrical conductor 580 may be spliced or otherwise connected with selected individual conductors of the electrical conductor 505 within or at selected electrical sockets 534. The electrical power communicated through the conveyance means 160 and the electrical conductors 145, 205, 505, 580 may be utilized to operate electrical components of the sensor tool 500 and/or to reserve (or perhaps even recharge) the energy of the power source 524. In a similar implementation, the power source 524 may be omitted, wherein the electrical components of the sensor tool 500 may be powered solely from the wellsite surface 105 via the conveyance means 160 and the electrical conductors 145, 205, 505, 580.

The chassis 520 may further comprise one or more mounting plates 536 extending longitudinally within the bore 504 between the support member 530 and the receptacle portion 540. The mounting plates 536 may comprise one or more substantially planar surfaces, which may receive or abut one or more of the electronics boards 522. The mounting plates 536 may have sufficient thickness and/or strength so as to aid in preventing or minimizing flexing during jarring and other operations, which may aid in preventing or minimizing physical damage to the electronics boards 522.

The mounting plates 536 of the chassis 520 may comprise one or more openings (not shown) to receive one or more fasteners 554 operable to fixedly connect the electronics boards 522 to the mounting plates 536. The electronics boards 522 may comprise coupled thereto a processor 556, a memory device 558, and a plurality of sensors, such as a temperature sensor 560, a pressure sensor 562, and/or an inclination sensor 564. The electronics boards 522 may facilitate mounting of the sensors 560, 562, 564 on the chassis 520 and communication between the sensors 560, 562, 564, the processor 556, and the memory device 558. One or more of the sensors 560, 562, 564 may function as a detector for detecting a quality of an operating environment of the sensor tool 500, which may affect the measurement of the impact imparted by the jarring tool 200 during jarring operations. For example, during, prior to, or after the jarring operations, the sensors 560, 562, 564 may generate electrical output signals indicative of the quality of the operating environment, such as temperature, pressure, and inclination of the sensor tool 500. The output signals may be communicated to the processor 556 and the output signals or data generated by the processor may be stored on the memory device 558. This information may be utilized to calibrate the impact measurements obtained via the accelerometer 526.

The sensor tool 500 may further comprise a load cell 568 or another strain measuring sensor connected to the second inner surface 509 of the housing 502. The load cell 568 may be operable to measure strain within the housing 502 during jarring and other operations. The strain data generated by the load cell 568 may be utilized to calculate the forces imparted into the sensor tool 500 and, therefore, the second portion 150 of the tool string 110 during jarring and other operations.

The accelerometer 526 may be mounted on the housing 502, one of the electronics boards 522, or the chassis 520, including the mounting plates 536 and the receptacle portion 540. The accelerometer 526 may comprise a one, two, or three-axis accelerometer operable to measure acceleration/deceleration of the housing 502 of the sensor tool 500 along the central axis 506 of the sensor tool 500 and/or along axes perpendicular to the central axis 506. The central axis 506 may substantially coincide with the longitudinal axis of the wellbore 120. The accelerometer 526 is operable to measure acceleration ranging between about 2000 G and about 5000 G. That is, the accelerometer 526 does not measure the shock and/or acceleration of normal handling of the sensor tool 500 and non-jarring operations of the tool string 110, which are generally less than about 1000 G. The Applicant has determined that the accelerometers capable of accurately measuring the shock and/or acceleration of normal handling of the sensor tool 500 and non-jarring operations of the tool string 110 cannot also accurately measure the acceleration of jarring operations. Implementations within the scope of the present disclosure may also comprise multiple instances of the accelerometer 526, including implementations in which each accelerometer 526 may detect a different range of acceleration. The acceleration data generated by the accelerometer 526 may be utilized to calculate the impact forces imparted into the sensor tool 500 and, therefore, other portions of the tool string 110, during jarring operations.

The accelerometer 526 and the load cell 568 may be electrically or otherwise operably connected with at least one of the electronics boards 522 by leads, wires, and/or other electrical conductors 565 connected with another power and communications interface 566 of the electronics boards 522. The accelerometer 526 and the load cell 568 may generate electrical output signals indicative of quantities or parameters, such as acceleration and strain, experienced by the sensor tool 500 during jarring operations. The output signals may be communicated to the electronics boards 522, processed by the processor 556, and stored on the memory device 558.

Instead of storing the electrical output signals from the accelerometer 526 and/or the sensors 560, 562, 564, 568 on the memory device 558, the output signals may be communicated to the wellsite surface 105 in real-time through the electrical conductors 580, 505, 205, 145 and the conveyance means 160. For example, the output signals generated by the accelerometer and sensors described herein may be received by the electronics boards 522, processed, amplified, and communicated to the wellsite surface 105 through the electrical conductors 580, 505, 205, 145 and the conveyance means 160. Thereafter, the output signals may be analyzed at the wellsite surface 105 and/or recorded by the surface memory device 177. The electrical output signals may also be recorded by the downhole memory device 558 and simultaneously communicated to the wellsite surface 105, such as to be recorded by the surface memory device 177. The data stored on the memory device 558, communicated to the wellsite surface 105, and/or stored on the surface memory device 177 may include the raw data from the accelerometer(s) 526 and/or the sensors 560, 562, 564, 568, or processed data obtained utilizing the raw data, such as in implementations in which the raw data from the accelerometer(s) 526 is calibrated to account for the potentially extreme temperature, pressure, strain, and/or other factors of the operating environment downhole during jarring operations.

In the context of assembling the sensor tool 500 prior to incorporation into the tool string 110, the first and the second inner surfaces 508, 509 of the housing 502 may be substantially smooth and/or otherwise permit the chassis 520 to be slidably inserted and moved axially along the bore 504 until the shoulder 570 of the chassis 520 contacts the first shoulder 518 of the housing 502. Once fully inserted into the bore 504, the chassis 520 may be retained in the bore 504 by a fastener 572 operable to engage the chassis 520 and the housing 502. The fastener 572 may be or comprise a threaded retaining ring having external threads operable to engage corresponding internal threads of the housing 502 and, thereby, prevent the chassis 520 from moving out of the bore 504. Furthermore, the fastener 572 may comprise an opening 574 extending therethrough, such as may permit the electrical conductors 505, 525 to extend therethrough and electrically connect with the lower electrical connector 546.

Although FIG. 3 shows the chassis 520 as being a single, discrete member, the chassis 520 may also be formed from two or more separate and distinct portions. For example, the support member 530, the mounting plates 536, and the receptacle portion 540 may be separate and distinct portions coupled together via threaded engagement, fasteners, interference/press fit, and/or other fastening means.

As shown in FIG. 3, the lower electrical connector 546 may be operable to electrically connect the sensor tool 500 with the second portion 150 of the tool string 110. The lower electrical connector 546 may comprise a substantially cylindrical body and be disposed within the central bore 504 at or near the lower interface of the sensor tool 500. The lower electrical connector 546 may be disposed against the third inner surface 511 of the housing 502 and in contact with the second shoulder 519 protruding radially into the bore 504, such as to maintain the lower electrical connector 546 in a predetermined position with respect to the lower mechanical fastening means 514 of the lower interface. The lower electrical connector 546 may comprise a plurality of pins 578 extending therefrom and electrically connected with the plurality of individual conductors of the electrical conductor 505. The plurality of pins 578 may engage a plurality of sockets of the corresponding electrical connector (not shown) of the upper interface of the second portion 150 of the tool string 110. Although one implementation of the lower electrical connector 546 is shown, the lower electrical connector 546 may be or comprise other electrical connectors known in the art, such as may be operable to mate or otherwise electrically connect with the corresponding electrical connector of the upper interface of the second portion 150 of the tool string 110. The lower electrical connector 546 may also be omitted, such as in implementations in which the individual conductors of the electrical conductor 505 may be spliced or otherwise connected with individual conductors of the electrical conductor 155 of the second portion 150 of the tool string 110 or another electrical conductor.

In addition to the implementation shown in FIGS. 1 and 2, in which the sensor tool 500 is coupled below the jarring tool 200 (between the jarring tool 200 and the second portion 150 of the tool string 110), the sensor tool 500 may be coupled above the jarring tool 200, such as between the jarring tool 200 and the first portion 140 of the tool string 110. The sensor tool 500 may also be coupled between opposing portions of the first portion 140 of the tool string 110, between opposing portions of the second portion 150 of the tool string 110, above the first portion 140 of the tool string 110, or below the second portion 150 of the tool string 110. Multiple instances of the sensor tool 500 may also be incorporated into the tool string 110 at multiple locations, such as a first instance coupled between the first portion 140 of the tool string 110 and the jarring tool 200 and a second instance coupled between the jarring tool 200 and the second portion 150 of the tool string 110.

During operation of the tool string 110, the tool string 110 with the jarring tool 200 and the sensor tool 500 may be conveyed within the wellbore 120 that extends into the subterranean formation 130, as shown in FIG. 1. During such conveyance, the jarring tool 200 may be in the first configuration, as shown in FIG. 2, in which the detector 420 is detecting an electrical characteristic (e.g., current and/or voltage) from the electrical conductor 205, such as may be received via electronic communication with surface equipment 175 via the electrical conductor 145 of the first tool string portion 140 and the conveyance means 160. However, the jarring tool 200 may also be in the second configuration described above (not shown), in which the detector 420 is not detecting the electrical characteristic (or is detecting the absence of the electrical characteristic) from the electrical conductor 205. The operation of the jarring tool 200 may comprise actively setting or adjusting the jarring tool 200 between the first and second configurations, such as by operating the surface equipment 175 to establish the electrical characteristic detectable by the detector 420. During subsequent operations, the second tool string portion 150 may become lodged or stuck in the wellbore 120. Consequently, the jarring tool 200 may perform a power stroke when the jarring tool 200 is in either the first or second configuration.

During the power stroke, the tensioning device 170 of the surface equipment 175 is increasing the tension applied across the tool string 110 by pulling on the conveyance means 160. As the tension increases, the engagement between the female and male latch portions 275, 280 operates to overcome the biasing force of the upper and/or lower spring stacks 350, 355, thus causing the upper housing 242 to translate axially away from the lower housing 265. The tension is further increased in this manner by an amount sufficient for the blocking section 465 of the anti-release member 285 to emerge from within the ends of the flexible members 320 of the male latch portion 280, resulting in an impact actuation.

As stated above, such impact may be initiated in the first or "low-force" configuration of the jarring tool 200, when the detector 240 is detecting the electrical characteristic via the electrical conductor 205, or in the second or "high-force" configuration of the jarring tool 200 when the detector 240 is not detecting (or is detecting the absence of) the electrical characteristic. The resulting impact force is imparted to the lower tool string portion 150, such as along a load path extending from impact features 495 to the lower tool string portion 150 via the lower housing 265 and the housing 502 of the sensor tool 500.

In the first or "low-force" jarring tool configuration, the detector 420, the plunger 430, the mandrel 435, and/or the biasing member 460 may be collectively operated to move the blocking section 465 of the anti-release member 285 in the upward direction to decrease the distance 470 by which the upper and/or lower spring stacks 350, 355 may be compressed for the flexible fingers 320 to deflect radially inward and disengage from the female latch portion 275. Consequently, the upper ends of the flexible members 320 of the male latch portion 280 are able to deflect radially inward, thus permitting the disengagement of the female and male latch portions 275, 280, such that the upper housing 242 rapidly translates away from the lower housing 265 until one or more shoulders, bosses, flanges, and/or other impact features 490, connected to the shaft 270, collide with a corresponding one or more shoulders, bosses, flanges, and/or other impact features 495, connected to the third upper housing portion 260. During the jarring operations, one or more of the temperature sensor 560, the pressure sensor 562, the inclination sensor 564, the load cell 568, and the accelerometer 526 may generate one or more output signals relating to or indicative of the impact imparted by the jarring tool 200 and/or the current operating environment of the sensor tool 500, as described above. The output signals may be recorded on the downhole memory device 558 and/or communicated to the wellsite surface 105, such as to be recorded on the surface memory device 177.

Operation of the jarring tool 200 may comprise multiple iterations of the "low-force" power stroke and reengagement of the female and male latch portions 275, 280 until the impact force iteratively imparted to the second tool string portion 150 is sufficient to dislodge the second tool string portion 150. However, the impact force imparted to the second tool string portion 150 by the jarring tool 200, when operating the jarring tool 200 in the first configuration, may not be sufficient to dislodge the second tool string portion 150. In such situations, the jarring tool 200 may then be set or adjusted to the second or "high-force" configuration, as described above, in which the detector 420 is not detecting the electrical characteristic (or is detecting the absence of the electrical characteristic) from the electrical conductor 205, so as to produce a "high-force" power stroke. In the second configuration, the jarring tool 200 and/or tool string 110 may be "turned off" such that the electrical characteristic is not detected by the detector 240, causing the blocking section 465 of the anti-release member 285 to extend downwards further into the male latch portion 280 and therefore increase the distance 470. A greater tension may then be applied by the tensioning device 170 to the conveyance member 160 to compress the upper and/or lower spring stacks 350, 355 by the increased distance 470, such that the flexible fingers 320 may deflect radially inward and disengage from the female latch portion 275, thereby generating the "high-force" impact. Operation of the jarring tool 200 may then comprise multiple iterations of the "high-force" power stroke and reengagement the female and male latch portions 275, 280, until the impact force iteratively imparted to the lower tool string portion 150 is sufficient to dislodge the lower tool string portion 150.

Figure 5:
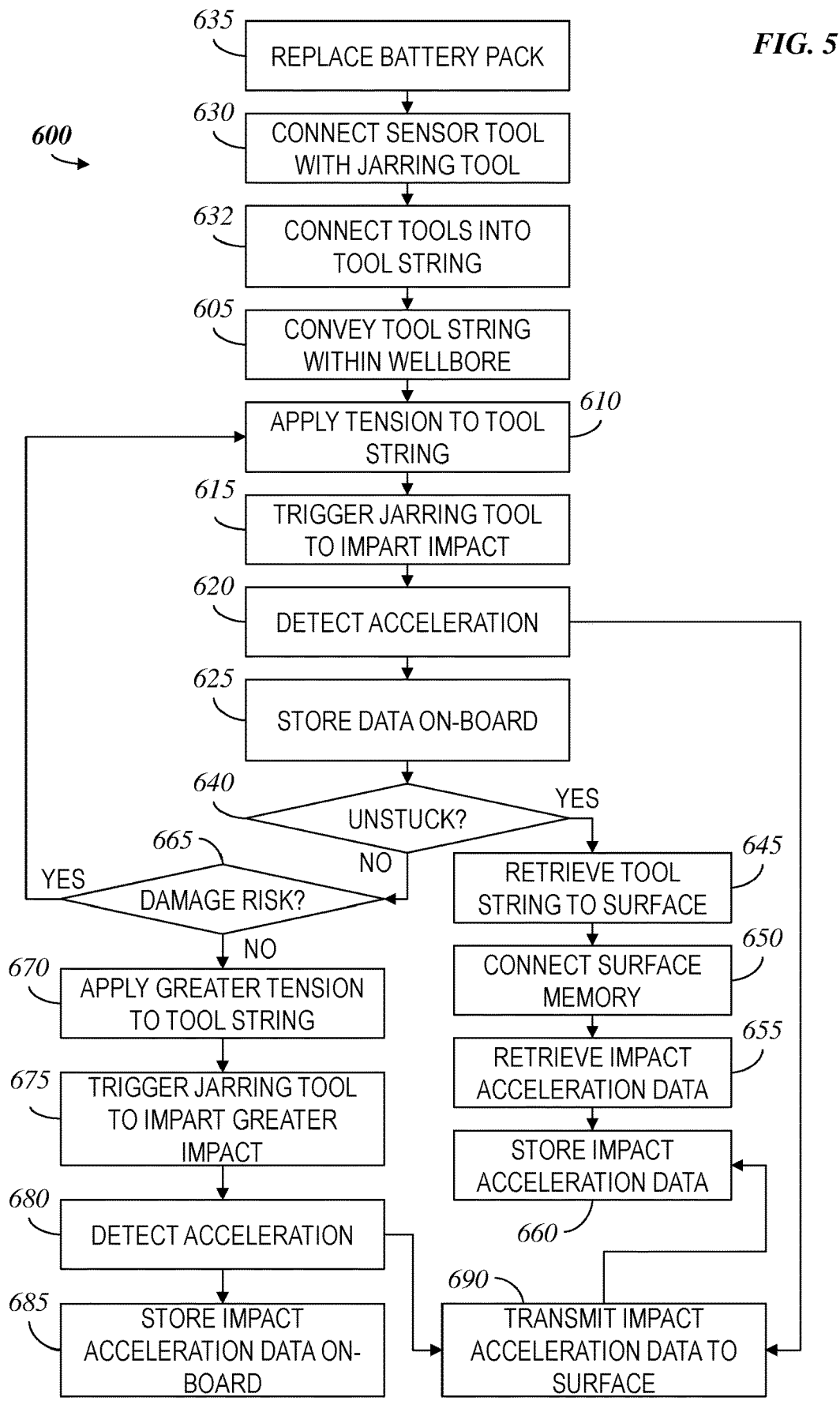
FIG. 5 is a flow-chart diagram of at least a portion of an example implementation of a method according to one or more aspects of the present disclosure.

FIG. 5 is a flow-chart diagram of at least a portion of an example implementation of a method 600 according to one or more aspects of the present disclosure. The method 600 may be utilized to operate a jarring tool and a sensor tool, such as at least a portion of the jarring tool 200 and the sensor tool 500 shown in one or more of FIGS. 1-4. Thus, the following description refers to FIGS. 1-5, collectively.

The method 600 may comprise conveying 605 a tool string 110 comprising a jarring tool 200 and a sensor tool 500 within a wellbore 120 and applying 610 tension to the tool string 110, ultimately including triggering 615 the jarring tool 200 to impart an impact to the tool string 110. As described above, the jarring tool 200 may comprise a housing and a shaft 270. The housing may comprise an upper housing 242 and a lower housing 265 slidably connected by the shaft 270, and triggering 615 the jarring tool 200 to impart an impact to the tool string 110 may comprise triggering the jarring tool 200 such that the upper housing 242 rapidly moves in an upper direction relative to the lower housing 265 until the upper and lower housings 242, 265 collide, thus generating the impact imparted to the tool string 110.

As described above, the sensor tool 500 may comprise one or more accelerometers 526, one or more environment sensors 560, 562, 564, 568, and a memory device 558. The method 600 also comprises detecting 620 acceleration during the impact, via the accelerometer(s) 526, and storing 625 impact acceleration data generated by the accelerometer(s) 526 on the memory device 558. The detected 620 and stored 625 data may also include data from one or more of the environment sensors 560, 562, 564, 568.

The method 600 may further comprise connecting 630 the sensor tool 500 with the jarring tool 200 prior to conveying 605 the tool string 110 within the wellbore 120. For example, the lower mechanical fastening means 218 of the jarring tool 200 may be connected to the upper mechanical fastening means 512 of the sensor tool 500, and the one or more lower electrical connectors 217 of the jarring tool 200 may be connected with the one or more upper electrical connectors 528 of the sensor tool 500. The one or more lower electrical connectors 217 of the jarring tool 200 may be connected with the one or more upper electrical connectors 528 of the sensor tool 500 prior to connecting the lower mechanical fastening means 218 of the jarring tool 200 to the upper mechanical fastening means 512 of the sensor tool 500, or connecting the lower mechanical fastening means 218 of the jarring tool 200 to the upper mechanical fastening means 512 of the sensor tool 500 may simultaneously connect the one or more lower electrical connectors 217 of the jarring tool 200 with the one or more upper electrical connectors 528 of the sensor tool 500.

The method may further comprise connecting 632 the connected 630 jarring and sensor tools 200, 500 into the tool string 110. For example, the upper mechanical fastening means 212 of the jarring tool 200 may be connected to a corresponding interface of the first portion 140 of the tool string 110, and the lower mechanical fastening means 514 of the sensor tool 500 may be connected to a corresponding interface of the second portion 150 of the tool string 110. Such connecting 632 would further comprise connecting the one or more upper electrical connectors 215 of the jarring tool 200 with a corresponding lower electrical connector of the first portion 140 of the tool string 110, and connecting the one or more lower electrical connectors 546 of the sensor tool 500 with a corresponding upper electrical connector of the second portion 150 of the tool string 110. As above, the electrical connection may be made before making the mechanical connection, or making the mechanical connection may simultaneously make the electrical connection.

The method 600 may further comprise replacing 635 the battery pack 524 by disconnecting and removing the battery pack 524 from the chassis 520 and inserting and connecting a replacement battery pack 524 into the chassis 520. Such battery replacement 635 would be performed prior to connecting 632 the connected 630 jarring and sensor tools 200, 500 into the tool string 110.

The method 600 may also comprise determining 640 whether the stuck portion of the tool string 110 has become dislodged or unstuck. If it is determined 640 that the stuck portion of the tool string 110 has become dislodged, the method 600 may comprise retrieving 645 the tool string 110 to the wellsite surface 105. The method 600 may then comprise electrically connecting 650 a surface memory device 177 with the sensor tool 500, retrieving 655 the impact acceleration data from the downhole memory device 558, and storing 660 the impact acceleration data on the surface memory device 177.

If it is determined 640 that the stuck portion of the tool string 110 has not become dislodged, the method 600 may comprise assessing 665 the risk of damage to the tool string 110 by impact acceleration forces, such as by comparing the acceleration caused by the impact to a predetermined level of acceleration that the tool string 110 can operationally withstand. If it is determined 665 that the acceleration caused by the impact is at or near the predetermined level, the impact may be repeated by again applying 610 the tension to the tool string 110, including ultimately triggering 615 the jarring tool again impart the impact to the tool string 110. However, if it is determined 665 that the acceleration caused by the impact is substantially less than the predetermined level (e.g., by at least about twenty percent), then a second tension that is greater than the first tension (e.g., by about ten percent) may be applied 670 to the tool string 110, including ultimately triggering 675 the jarring tool to impart a second, greater impact to the tool string 110. In such instances, the method 600 may also comprises detecting 680 the greater acceleration during the second, greater impact, via the accelerometer(s) 526, and storing 685 impact acceleration data generated by the accelerometer(s) 526 on the memory device 558. The detected 680 and stored 685 data may also include data from one or more of the environment sensors 560, 562, 564, 568.

As described above, the tool string 110 may further comprise one or more electrical conductors 145, 205, 505, 155 extending between the jarring tool 200, the sensor tool 500, and a wellsite surface 105. The method 600 may further comprise transmitting 690 the impact acceleration data from the sensor tool 500 to the wellsite surface 105 through the one or more electrical conductors 145, 205, 505, 155, and storing 660 the acceleration data on the surface memory device 177, after one or more of the impact generation 615, 675, whether instead of or in addition to connecting 650 the surface memory device 177 with the sensor tool 500 and retrieving 655 the impact acceleration data from the downhole memory device 558.

Figure 6:
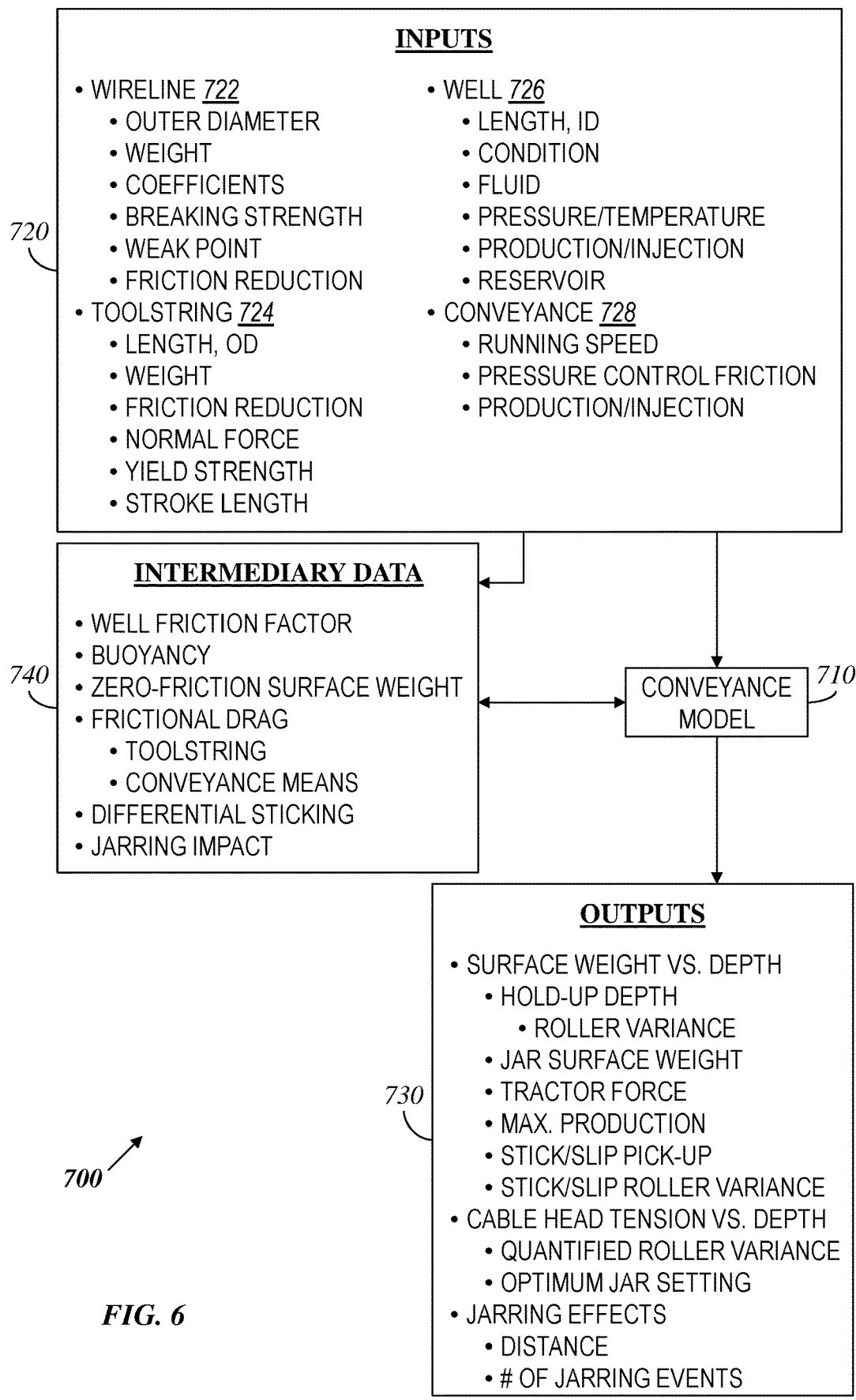
FIG. 6 is a schematic view of at least a portion of an example implementation of a conveyance analysis engine according to one or more aspects of the present disclosure.

FIG. 6 is a schematic diagram of at least a portion of an example implementation of a conveyance analysis engine 700 according to one or more aspects of the present disclosure. The engine 700 comprises a conveyance model 710 that utilizes inputs 720 to generate outputs 730. In the example implementation depicted in FIG. 6, the inputs 720 include wireline inputs 722, toolstring inputs 724, well inputs 726, and conveyance inputs 728.

The wireline inputs 722 may include (1) outer diameter (OD) of the wireline, (2) weight (e.g., per unit length) of the wireline (e.g., in air), (3) various coefficients descriptive of the wireline (e.g., stretch, elastic modulus, shear modulus, bulk modulus, Poisson's ratio, thermal expansion, etc.), (4) breaking strength of the wireline, (5) weak point location(s), and (6) information about friction reduction means of the wireline (e.g., coatings, sleeves, standoffs, roller devices, etc.). The toolstring inputs 724 may be applicable to the entire toolstring, when assembled, and/or to individual tools, modules, and/or other components of the toolstring, and may include (1) length, (2) OD (e.g., maximum OD, changes in OD (such as an outer profile), etc.), (3) weight (e.g., in air), (4) information about friction reduction means (e.g., coatings, sleeves, standoffs, roller devices, etc.), (5) normal force (acting perpendicular to the well centerline), (6) yield strength, and (7) stroke length (e.g., of an impact jar, linear actuator, etc.). The well inputs 726 may be applicable to the entire well and/or to individual, axially-extending sections of the well, and may include (1) length, (2) inner diameter (ID) of the well (such as minimum ID, changes in ID (such as an inner profile), etc.), (3) information about the condition of the well (e.g., open-hole or cased, mudcake condition (e.g., thickness) etc.), (4) information about fluid (including gas) in the well (e.g., composition, pressure, temperature, density, viscosity, etc.), (5) pressure and/or temperature at the top and/or bottom of the well, (6) information about production into the well from the intersected reservoir(s)/formation(s) and/or injection from the well into the intersected reservoir(s)/formation(s) (e.g., fluid (including gas) composition, pressure, temperature, density, viscosity, flow rate, etc.), and (7) information about the reservoir(s)/formation(s) intersected by the well (e.g., boundary depths, pressure, temperature, skin factor, permeability, etc.). The conveyance inputs 728 may include running speed, friction of pressure control, and information about production from the well to surface equipment and/or injection into the well from surface equipment (e.g., fluid (including gas) composition, pressure, temperature, density, viscosity, flow rate, etc.).

The inputs 720 may vary from the example implementation depicted in FIG. 6. For example, the inputs 720 may also include information obtained via one or more of the sensors described above, whether in addition to or instead of one or more of the inputs 720 depicted in FIG. 6. The inputs 720 may also include information obtained via human experience, such as empirical evidence obtained during testing (e.g., lab testing) and/or actual operations performed in the well and/or other wells. The inputs 720 may include those described above and/or shock (acceleration—high and/or low frequency), tension and/or compression (high and/or low frequency), inclination, pressure, temperature, radial orientation, friction, velocity, torque, vibration, fluid parameters (viscosity, weight, pressure temperature, density, bubble point, saturation point, dew point, etc.), well bore geometry (e.g., caliper), depth, and/or other measured (and/or otherwise obtained) inputs hereby deemed to also be within the scope of the present disclosure.

The engine 700 may also utilize intermediary data 740 determined, estimated, and/or otherwise based on the inputs 720. The intermediary data 740 may be determined via the conveyance model 710, another part of the conveyance analysis engine 700, a human operator, and/or otherwise. For example, the intermediary data 740 may include a well friction factor assigned to each section of well. The well friction factor may be based on the well inputs 726, including information about the well/section condition and fluid/gas therein, and/or other information. The intermediary data 740 may include buoyancy information, such as the buoyant weight of the toolstring and wireline obtained based on the toolstring data 724, the well data 726 (such as about fluid/gas in the well), information about pressure and/or pressure control in the well, and/or other information. The intermediary data 740 may include a zero-friction surface weight estimate or prediction, such as may be obtained via the resolution of the forces acting in the well, including the buoyant weight of the toolstring and wireline times depth at deviation. The intermediary data 740 may include frictional drag (e.g., mechanical and/or from fluid in the well) on the toolstring and the various means of conveyance being utilized (e.g., wireline, tractors, roller devices, standoffs, etc.) For example, the frictional drag may include mechanical drag estimated, determined, and/or otherwise based on normal force times a friction coefficient (e.g., dynamic), and/or fluid-based drag based on fluid pressure drag, form drag, and/or shear drag. The intermediary data 740 may include differential sticking forces, such as based on pressure differential (reservoir to well), mud cake factor, and area of the toolstring in contact with the sidewall of the well. The intermediary data 740 may include jarring impact information, such as the size and stroke of jar included in the tool string, dampening factors, and/or other information.

Bringing the differential sticking and jarring impact determinations together may be advantageous in myriad implementations within the scope of the present disclosure. For example, this can permit deriving or otherwise determining the jarring effects of distance and number of jarring events to become unstuck. However, other advantages and implementations are also within the scope of the present disclosure.

The outputs 730 of the conveyance model 710, based on one or more of the inputs 720 and/or one or more of the intermediary data 740, may include a graph and/or other data descriptive of how an estimated, predicted, or otherwise obtained surface weight (e.g., weight of the toolstring and wireline as measured by surface equipment) varies versus depth of the toolstring (e.g., at the bottom end, the cable head, the midpoint, and/or other component of or location within the toolstring). For example, the surface weight versus depth information may be the zero-friction result+/− mechanical drag+/− fluid drag. The surface weight versus depth information may include, or be utilized to determine, (1) the hold-up depth of the toolstring (perhaps with and without roller devices, standoffs, and/or other friction reduction means), (2) the surface weight required to fire an impact jar included in the toolstring, (3) the tractor force required to pull the toolstring to a desired depth in the well, (4) the maximum allowable production rate, (5) the maximum pick-up weight required to overcome stick/slip, (5) how roller devices, standoffs, and/or other friction reduction means in the toolstring effect the stick/slip effect, and/or other information.

The outputs 730 of the conveyance model 710 may also (or instead) include cable head tension versus depth in the well, such as the difference between the resolved force of toolstring pulling in the well and the drag of the conveyance means. The cable head tension versus depth information may include, or be utilized to determine, (1) quantified differences resulting from adding roller devices, standoffs, and/or other friction reduction means to the toolstring, (2) optimum impact jar settings, (3) maximum allowable pump down rate, and/or other information.

The outputs 730 of the conveyance model 710 may also (or instead) include jarring force and/or other effects delivered to the toolstring, such as may be the product of (or otherwise based on) the jar settings and impact ratio. This jarring information may include the distance moved by the jar (and/or other portions of the toolstring) during each activation of the jar, and perhaps the number of jarring events estimated, predicted, and/or otherwise determined as necessary to overcome differential sticking of at least a portion of the toolstring and/or conveyance means.

Figure 7:
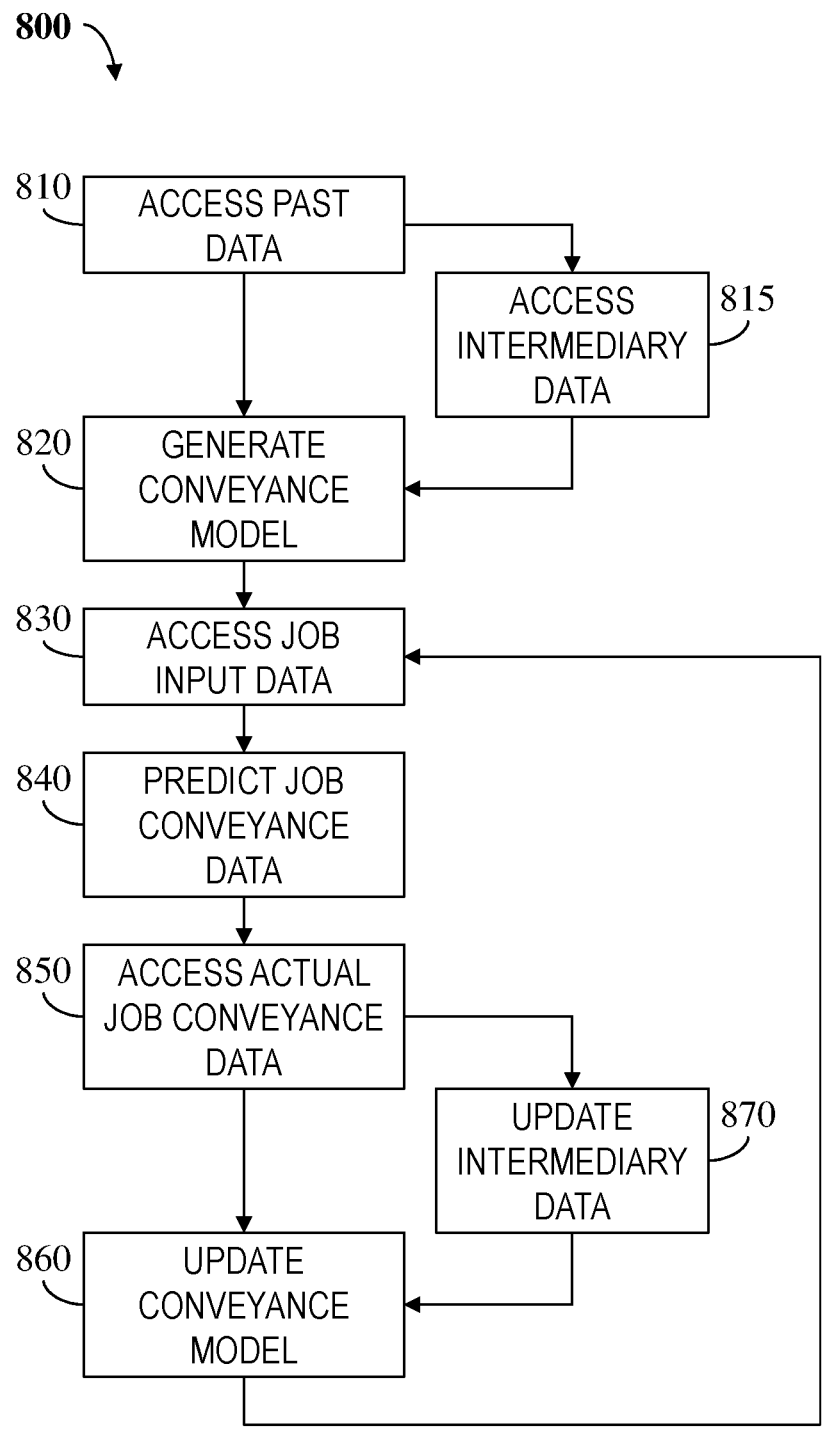
FIG. 7 is a flow-chart diagram of at least a portion of an example implementation of a method according to one or more aspects of the present disclosure.

FIG. 7 is a flow-chart diagram of at least a portion of an example implementation of a method 800 according to one or more aspects of the present disclosure. The method 800 may be utilized in conjunction with at least a portion of the apparatus shown in one or more of FIGS. 1-4, at least a portion of the method shown in FIG. 5, the engine 700 and/or model 710 shown in FIG. 6, and/or other aspects within the scope of the present disclosure.

The method 800 may include accessing 810 past data. The accessed 810 data may include multiple sets of the inputs 720 depicted in FIG. 6, and/or other data described herein, with each set corresponding to one or more operations in one or more wells. Each such operation may include running the toolstring into the well to the desired depth (RIH), pulling the toolstring out of the well (POOH), portions of an RIH or POOH, or combinations of such movements of the toolstring within the well.

The method 800 may also include accessing 815 intermediary data, such as may include multiple sets of the intermediary data 740 depicted in FIG. 6, and/or other data described herein, with each set corresponding to the same operations/wells of the accessed 810 past data. Accessing 815 the intermediary data may also or instead include generating one or more such sets of intermediary data 740 utilizing the accessed 810 past data.

The method 800 may also include generating 820 a conveyance model. The generated 820 conveyance model may be or include an instance of the conveyance model 740 generated via the engine 700 of FIG. 6. However, other methods may also or instead be utilized to generate 820 the conveyance model.

Generating 820 the conveyance model may include preprocessing the accessed 810/815 past/intermediary data. For example, the accessed 810/815 past/intermediary data may be filtered by selecting data sets that correspond to one or more parameters of wells (e.g., well types, conditions, dimensions, etc.), toolstrings, and/or operations, such as sets of the accessed 810/815 past/intermediary data in which one or more of the inputs 720/740 have values within predetermined ranges and/or satisfying other conditions. Thus, the filtering may select data sets in which values for one or more of the OD, weight, coefficient(s), breaking strength, weak point, friction reduction, and/or other parameters related to the wireline, one or more of the length, OD, weight, friction reduction, normal force, yield strength, stroke length, and/or other parameters related to the toolstring, one or more of the length, ID, condition, fluid, pressure, temperature, production/injection, reservoir, and/or other parameters related to the well, and/or one or more of the running speed, pressure control friction, production/injection, and/or other parameters related to conveyance each fall within maximum and minimum thresholds. The maximum and minimum thresholds utilized for such filtering may be predetermined or entered in real-time, and may also vary based on different types of the applicable wireline, toolstring, well, and/or other equipment, and/or for different conveyance scenarios, operating companies, geographic locations, and/or other variables.

The preprocessing may also or instead comprise downsampling. For example, such downsampling may comprise randomly or otherwise selecting a percentage of the accessed 810/815 past/intermediary data. Such downsampling may aid in removing noise from the accessed 810/815 past/intermediary data, and/or in detecting trends in the accessed 810/815 past/intermediary data before and/or after preprocessing.

The preprocessing may also or instead comprise temporally aligning the data relative to each other. Such alignment may be utilized to align known and/or predicted features in the data (e.g., peaks, valleys, plateaus, slopes, curves, etc., in the data, or in derivatives, integrals, and/or other mathematical operations on the data) with respect to time, and/or to account for different sampling frequencies existing within the accessed 810/815 past/intermediary data. The temporal alignment and/or other aspect of the preprocessing may otherwise provide general formatting to put the data into a form that can be fed into a machine learning algorithm, for example.

The method 800 includes accessing 830 actual job input data. The accessed 830 job input data may include one or more of the inputs (e.g., inputs 720 in FIG. 6), intermediary data (e.g., intermediary data 740 in FIG. 6), sensor measurements, and/or other variables described above. The accessed 830 job input data is then utilized with the generated 820 model to predict 840 job conveyance data. The predicted 840 job conveyance data may include one or more of the inputs (e.g., inputs 720 in FIG. 6), intermediary data (e.g., intermediary data 740 in FIG. 6), sensor measurements, outputs (e.g., outputs 730 in FIG. 6), and/or other variables described above. For example, the accessed 810/815 past/intermediary data may include data that is indicative of a first parameter and a plurality of second parameters of the job for which conveyance data is being predicted 840. The accessed 810/815 past/intermediary data may include values for the first and second parameters for past jobs, and the conveyance model generated 820 with the accessed 810/815 past/intermediary data may be utilized to predict a value(s) of the first parameter based on values for the second parameters in the accessed 830 job input data. Thus, predicting 840 the job conveyance data may utilize values of the second parameters in the accessed 830 job input data as inputs to the generated 820 conveyance model, which then predicts the value(s) of the first parameter(s) missing from the accessed 830 job input data.

The generated 820 conveyance model may include different models utilized for different aspects of the conveyance operations of the job. For example, different models may be utilized for RIH versus POOH, cased hole versus open-hole, different service companies, and/or the inclusion versus exclusion of roller devices, standoffs, and/or other friction reduction means, among other examples hereby deemed to also be within the scope of the present disclosure. Multiple predictive models may also be utilized for different sections of the well.

Generating 820 the conveyance model may include analytically identifying correlations between operational parameters available from previously analyzed conveyance operations represented by the accessed 810/815 past/intermediary data. Generating 820 the conveyance model may then include adjusting fitting parameters of the model (e.g., iteratively) to exploit correlations between each of the first and second operational parameters in the accessed 810/815 past/intermediary data to optimize prediction performance of the conveyance model.

For example, the accessed 810/815 past/intermediary data may be utilized to generate multiple feature-selection models, each predicting a corresponding one of the available operational parameters utilizing other ones of the available operational parameters. Thus, if there are twenty operational parameters available in the training data, then twenty feature-selection models may be generated. The first and second operational parameters may then be selected based on the correlation exhibited by the feature-selection models. That is, the one (or more) of the generated feature-selection models that exhibits the closest correlation between parameters may be selected. Selecting the first and second operational parameters may also be based on physical assumptions based on human observations of prior operations in the field and/or prior maintenance operations.

Selecting the first and second operational parameters based on correlation of the generated feature-selection models, however, may include first selecting the first operational parameters (the operational parameter for which data will be predicted 840), and then selecting which of the remaining operational parameters will be used for model inputs. Using each available input to model the predicted outputs is an option. However, it may be the case that just a few of the inputs contribute to the majority of the output variability. By removing data inputs that are unrelated and/or have small correlations to the desired output, modeling can be performed more quickly and more efficiently, and with less noise that may hinder the results of the analysis. Moreover, two or more inputs may be combined to create new parameters (e.g., intermediary data) that may improve results.

However, other processes may also or instead be utilized for generating 820 the predictive conveyance model. Such processes may include statistical and/or physics-based tools and methods able to take in selected first operational parameters of the past/intermediary data and then provide a prediction for the output. Physics-based modeling may utilize traditional physics equations derived from first principles to describe the behavior of a given system, and may provide insight into the physical behavior of the system and how that system is failing. However, in most complex systems with high dimensional data, first principle models have not been formulated, and determining the relationship between a given output and a large number of input parameters may not be a feasible task. In such scenarios, data driven, machine learning, and/or other statistical modeling techniques can be used with the accessed 810/815 past/intermediary data to train a model by feeding the algorithm data and then iteratively adjusting a set of model parameters in order to minimize the model error as compared to the accessed 810/815 past/intermediary data. Such methods may improve performance by finding correlations between the input data and a given output and then use the correlation strength to weight the input parameters. Generating 820 the conveyance model may also include normalizing the accessed 810/815 past/intermediary data along multiple dimensions to improve model performance.

The method 800 may also include accessing 850 actual job conveyance data. The accessed 850 job conveyance data may be utilized to update 860 the previously generated 820 conveyance model. For example, differences between the predicted 840 job conveyance data and the accessed 850 actual job conveyance data may be utilized to tweak coefficients, rules, relationships, formulas, algorithms, and/or other aspects of the generated 820 conveyance model. The accessed 850 job conveyance data may also or instead be utilized to update 870 coefficients, rules, relationships, formulas, algorithms, and/or other aspects of the previously accessed 815 intermediary data, which may then be utilized to update 860 the conveyance model. The updated 860 conveyance model may then be utilized with previously or newly accessed job input data to predict conveyance data of the same or another conveyance job.

Different aspects of the method 800 may be performed by different actors (e.g., different people, different computers, different companies, etc.). For example, a first company may access 810/815 the past/intermediary data and generate 820 the conveyance model, a second company may access 830 the job input data and predict 840 the job conveyance data, a third company may access 850 the actual job conveyance data, and a fourth company may update 855/860 the intermediary data and/or conveyance model. Alternatively, one company, or some other combination of companies, may perform all or portions of the method 800.

Figure 8:
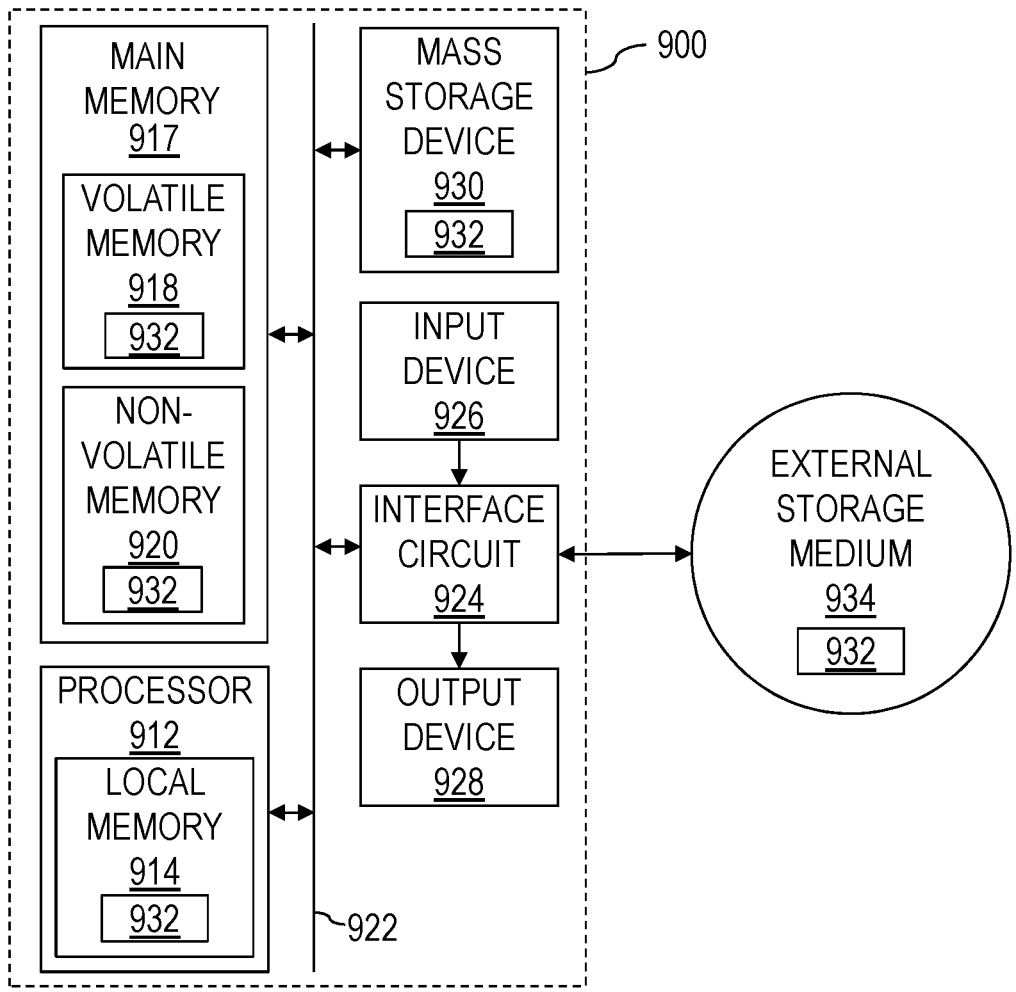
FIG. 8 is a schematic view of at least a portion of an example implementation of apparatus according to one or more aspects of the present disclosure.

FIG. 8 is a block diagram of at least a portion of an example implementation of a processing system 900 according to one or more aspects of the present disclosure. One or more instances of the processing system 900 may be in wired or wireless communication with the sensors, components, and/or other apparatus shown in one or more of FIGS. 1-4 and/or other apparatus within the scope of the present disclosure, whether the processing system 900 (or instance or portion thereof) is located at or remote from a wellsite. One or more instances of the processing system 900 may be operable to execute machine-readable instructions to perform at least a portion of the method 600 shown in FIG. 6, the engine 700 shown in FIG. 6, the method 800 shown in FIG. 7, and/or other methods within the scope of the present disclosure. One or more instances of the processing system 900 may be operable to implement at least a portion of one or more of the example apparatus described herein. The processing system 900 may be or comprise, for example, one or more processors, special-purpose computing devices, servers, personal computers, laptop computers, tablet computers, personal digital assistant (PDA) devices, smartphones, internet appliances, and/or other types of computing devices.

The processing system 900 may comprise a processor 912, such as a general- or special-purpose, programmable processor. The processor 912 may comprise a local memory 914, and may execute coded instructions 932 present in the local memory 914 and/or another memory device of the processing system 900. The processor 912 may be, comprise, or be implemented by one or a plurality of processors of various types suitable to the local application environment, and may include one or more of general-purpose processors or computers, special-purpose processors or computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 912 may be in communication with a main memory 917, such as may include a volatile memory 918 and a non-volatile memory 920, perhaps via a bus 922 and/or other communication means. The volatile memory 918 may be, comprise, or be implemented by random access memory (RAM), static random access memory (SRAM), synchronous dynamic random access memory (SDRAM), dynamic random access memory (DRAM), RAMBUS dynamic random access memory (RDRAM), flash memory, and/or other types of memory devices. The non-volatile memory 920 may be, comprise, or be implemented by read-only memory, flash memory, and/or other types of memory devices. One or more memory controllers (not shown) may control access to the volatile memory 918, the non-volatile memory 920, and/or other portions or components of the main memory 917. The processing system 900 may be operable to store or record (e.g., on the main memory 917) information entered by human operators and/or generated by the sensors of a wellsite system and/or other systems within the scope of the present disclosure.

The processing system 900 may also comprise an interface circuit 924. The interface circuit 924 may be, comprise, or be implemented by various types of standard interfaces, such as an Ethernet interface, a universal serial bus (USB), a third generation input/output (3GIO) interface, a wireless interface, a cellular interface, and/or a satellite interface, among other examples. The interface circuit 924 may also comprise a modem, a network interface card, and/or other communication devices to facilitate exchange of data with external computing devices via one or more networks (e.g., Ethernet connection, digital subscriber line (DSL), telephone line, coaxial cable, cellular telephone system, satellite, etc.). For example, the sensors and/or other components of a system according to one or more aspects of the present disclosure may be connected with the processing system 900 via the interface circuit 924.

One or more input devices 926 may also be connected to the interface circuit 924. The input devices 926 may permit human operators to enter the coded instructions 932, operational set points, and/or other data into the processing system 900. The input devices 926 may each be, comprise, or be implemented by a keyboard, a mouse, a touchscreen, a track-pad, a trackball, a camera, a voice recognition system, and/or an audio and/or visual recording device, among other examples.

One or more output devices 928 may also be connected to the interface circuit 924. The output devices 928 may each be, comprise, or be implemented by a display device (e.g., a light-emitting diode (LED) display, a liquid crystal display (LCD), or a cathode ray tube (CRT) display), printer, and/or speaker, among other examples.

The processing system 900 may also connect with or comprise one or more mass storage devices 930 and/or a removable storage medium 934. Each mass storage device 930 and/or removable storage medium 934 may be, comprise, or be implemented by at least a portion (e.g., sector) of a floppy disk drive, a hard disk drive, a compact disk (CD) drive, a digital versatile disk (DVD) drive, and/or a USB and/or other flash drive, among other examples.

The coded instructions 932, the operational set points, and/or other data may be stored in the mass storage device 930, the volatile memory 918, the non-volatile memory 920, the local memory 914, and/or the removable storage medium 934. Thus, components of the processing system 900 may be implemented in accordance with hardware (perhaps implemented in one or more chips including an integrated circuit, such as an ASIC), or may be implemented as software or firmware for execution by the processor 912. In the case of software or firmware, the implementation may be provided as a computer program product including a non-transitory, computer-readable medium embodying computer program code (i.e., software or firmware) thereon for execution by the processor 912.

An example conveyance model product is described below. However, it is to be understood that the following is merely an example, and that variations of the following example are also within the scope of the present disclosure.

The example product includes a web-based force and drag model, including at least basic hydraulics. The model may be able to predict, estimate, determine, and/or otherwise obtain (hereafter collectively "obtain") the maximum achievable depth of a wireline tool/toolstring, with and without roller devices (and/or other optional friction reduction means). The model may also or instead be able to obtain one or more optimal impact jar settings. The model may also or instead be able to obtain the tractor force required to pull the tool/toolstring to a desired depth (e.g., total depth, or TD), such as for scenarios in which the depth is not attainable by gravity alone. The model may also or instead be able to obtain an at least basic differential sticking force for independent permeable zones, such as in open-hole scenarios. The model may also or instead be able to obtain the production rate that would lift the tool/toolstring when the tool/toolstring was stationary, and/or the production rate that would prevent downhole passes. The model may also or instead be able to obtain the injection rate range that could be successfully utilized to pump the tool/toolstring to the desired depth (e.g., TD), but without breaking the weak point/50% breaking strength.

One or more of such results may be output via a surface weight graph from surface to the desired depth (e.g., TD) for run in and pull out, perhaps including a hold-up line. The graph may also include a curve representing 50% of breaking strength, and/or a curve representing jar firing force. One or more of the results may also or instead be output via a cable head tension graph from surface to the desired depth (e.g., TD) for run in and pull out. One or more of the results may also or instead be output via stretch profile from surface to the desired depth (e.g., TD) for run in and pull out. Such outputs may also be accompanied by a summary of the simulation/model inputs.

The model may permit the user to vary tool/toolstring friction independent of well friction. The model may also or instead permit the user to vary wireline friction independent of the tool/toolstring and/or well friction. The model may also or instead permit the user to select the display (or otherwise output) comparative results for different inputs on the same graphical outputs (and/or other output types). The model may also or instead permit the user to enter multiple "permeable zone" depths and pressures, such as for open-hole scenarios. The model may also or instead permit the user to choose from a limited selection of fluids contained in the well, such as gas, oil, water, brine, oil- or water-based mud, fracturing fluid, workover fluid, and/or other examples.

The model may be utilized by a human operator via one or more front end user interfaces permitting inputs as described above. Such inputs may include, for example: (1) well inputs, such as IDs at different depths, the well medium (perhaps including pressure and/or temperature at the top and/or bottom of the well), and/or well condition, among other examples; (2) tool/toolstring inputs, such as ODs, lengths, weights, friction reduction means, and/or centrality in the well, among other examples; and/or (3) wireline inputs, such as OD, weight in air, stretch, and/or breaking strength, among other examples. One or more of these and/or other example inputs may be entered each time the simulation is run, or may be obtained via libraries (and/or respective back end interfaces). The inputs may be recorded in a database for retrieval later, such as stored by job/project number, user identification, job/project name, secondary (e.g., user-specific) job/project number, and/or other parameters, such as in implementations permitting later analytics.

This example product may utilize a user interface such as (or similar to) the example user interface depicted in FIGS. 9-12. The depicted example user interface includes a graph area 1000, a well input area 1040, a toolstring input area 1060, and a wireline input area 1080.

Figure 9:
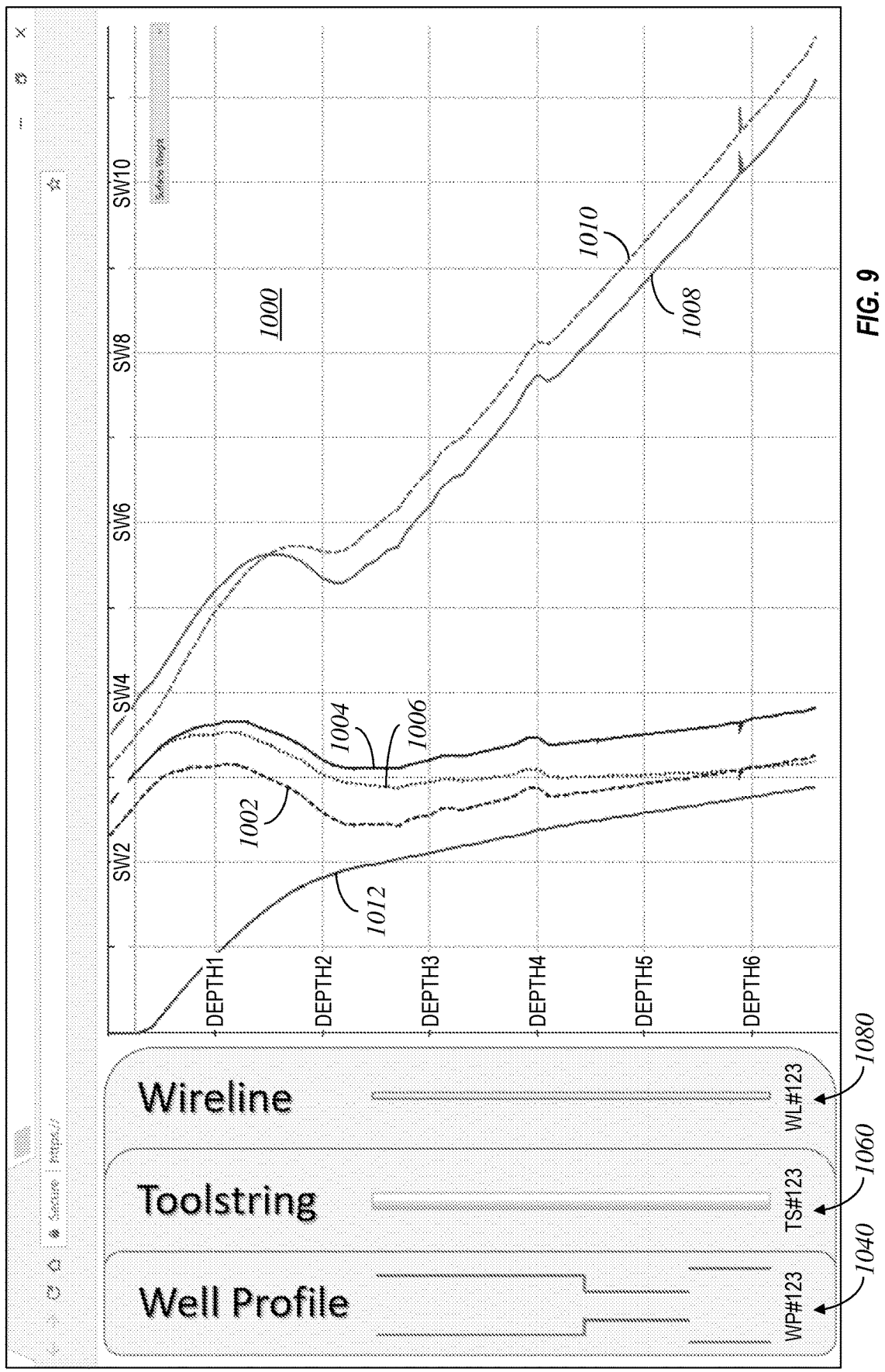
FIGS. 9-12 are views of an example user interface according to one or more aspects of the present disclosure.
Figure 10:
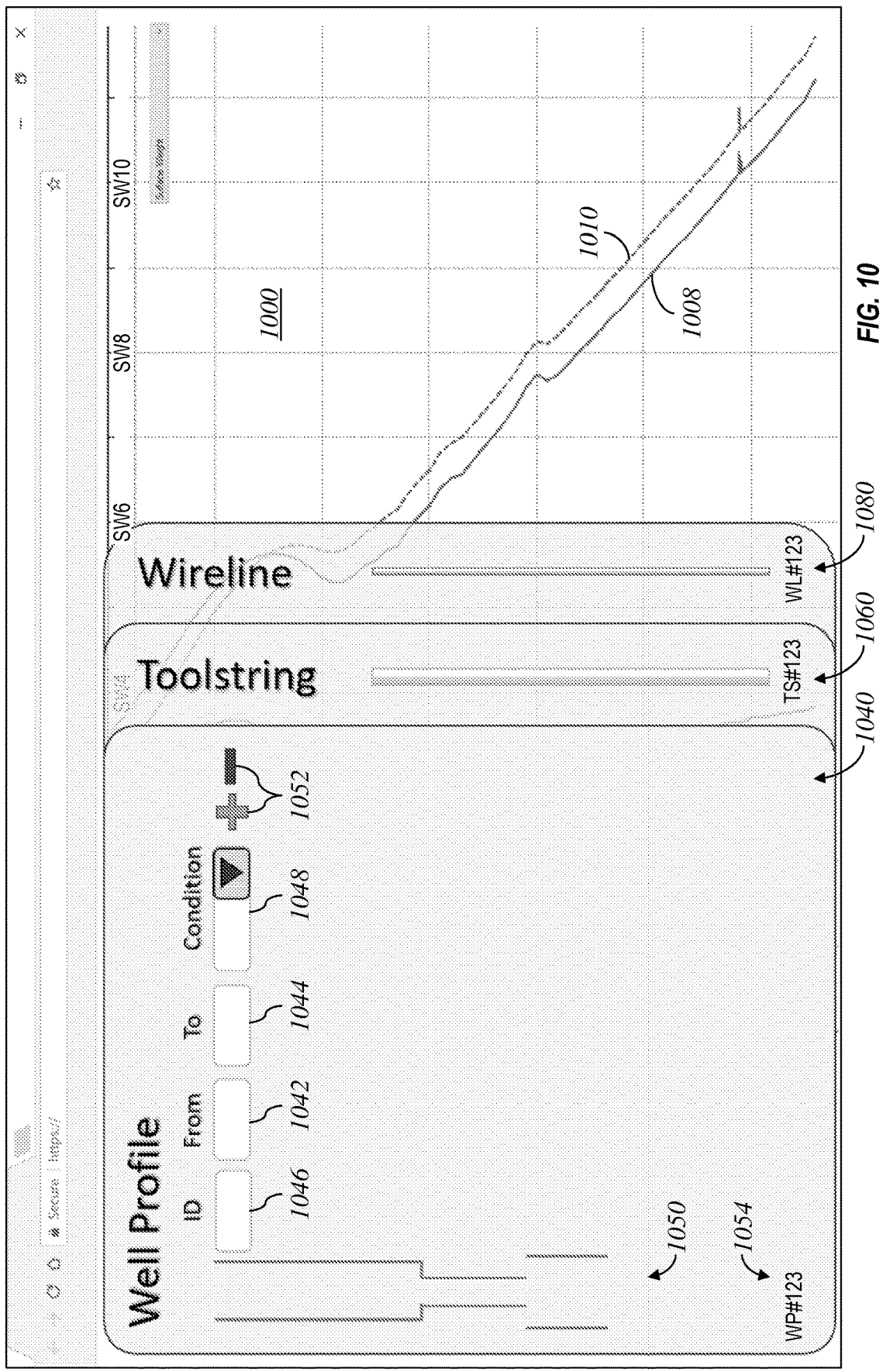

FIG. 9 depicts the input areas 1040, 1060, 1080 as being collapsed, and each input area may be expanded by clicking, touching, or otherwise selecting the desired area. For example, FIG. 10 depicts the well input area 1040 after expansion so that the user may enter text defining axial sections of the well, such as between a "From" depth field 1042 and a "To" depth field 1044, as well as an inner diameter of each axial section in an "ID" field 1046. The well inputs may also include a "Condition" pop-down menu 1048 to select one of a predetermined list of conditions (e.g., new, good, average, issues, bad, open-hole, etc.) of the well in each axial section, and perhaps a medium pop-down menu (not shown) to select one of a predetermined list of mediums/fluids substantially filling each axial section. The well input area 1040 may also include a graphic 1050 schematically depicting the well profile, and perhaps text input fields (not shown) at the top and/or bottom of the well graphic for pressure and/or temperature inputs. A well profile identifier 1054 may also be displayed in the well input area 1040. The profile graphic 1050 and identifier 1054 may remain visible with the well input area 1040 is collapsed, as depicted in FIG. 9. The pop-down menus may include or be associated with explanatory help pop-ups, and may relate to a coefficient matrix cross referenced against the medium selection, such as in the following table.

|  | RIH | New |
| --- | --- | --- |
|  | Gas | 0.25 |
|  | Oil | 0.15 |

Plus/minus signs and/or other selectable icons 1052 may be utilized to add/delete well sections. When adding a section, the previous section's selections may be recalled and presented, such as may minimize entries needed to complete the well profile.

Where open-hole is selected over certain depths, a sub-list (not shown) may appear to permit the user to enter multiple reservoir zones and their pressures. This information may be used to obtain a differential sticking force from the differential pressure of the hydrostatic pressure at the middle point of that zone.

Well survey importation may be a standard "browse for file" action, perhaps with added functionality to scan a selected document. This may permit the model to find columns of data for MD, Inc, and Azi, and populate a hidden deviation survey table.

Figure 11:
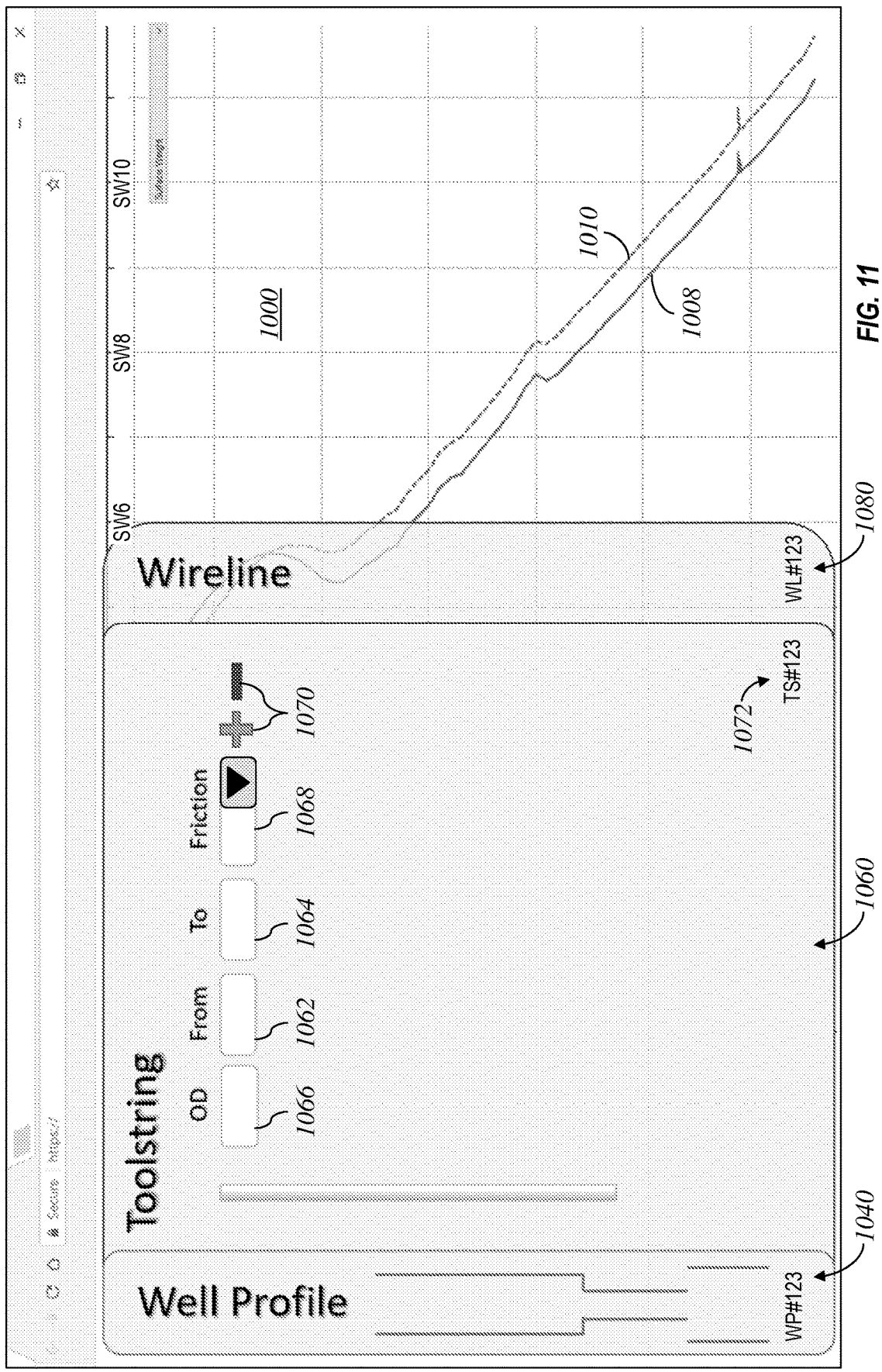

FIG. 11 depicts the toolstring area 1060 after expansion so that the user may enter text defining axial sections of the toolstring, such as between a "From" depth field 1062 and a "To" depth field 1064, as well as an outer diameter of each axial section in an "OD" field 1066. The toolstring inputs may also include a weight text box (not shown) and a friction drop-down menu 1068 for each toolstring section. The friction drop-down menu 1068 may permit selecting from a list of predetermined friction factors, such as friction reduction factors ranging from 10% to 100% in 10% intervals, among other examples. Where the ID of the section above and below one section are both greater, the friction factor may be automatically set to 10% (or some other maximum friction reduction status) for the smaller section, but this may also be overwritten by the user. This feature could be expanded to automate the friction reduction at any level and/or for all tools, and may be based on data from previous operations and/or testing, such as physical sag testing of different lengths, ODs, tool types, and connection types between larger tools of varying sizes. This automation may also add intermediary calculations and/or results as described elsewhere herein.

Plus/minus signs and/or other selectable icons 1070 may be utilized to add/delete toolstring sections. When adding a section, the previous section's selections may be recalled and presented, such as may minimize entries needed to complete the toolstring profile. A toolstring identifier 1072 may also be displayed in the toolstring input area 1060.

Although not shown in FIG. 11, the toolstring input area 1060 may include a check box or some other way of indicating that a particular toolstring section is or includes an impact jar, a tractor, a roller device, a standoff, a centralizer, and/or other conveyance assisting devices. Such indications may be utilized to inform the model to conduct additional calculations related to such devices, for display in the results.

Figure 12:
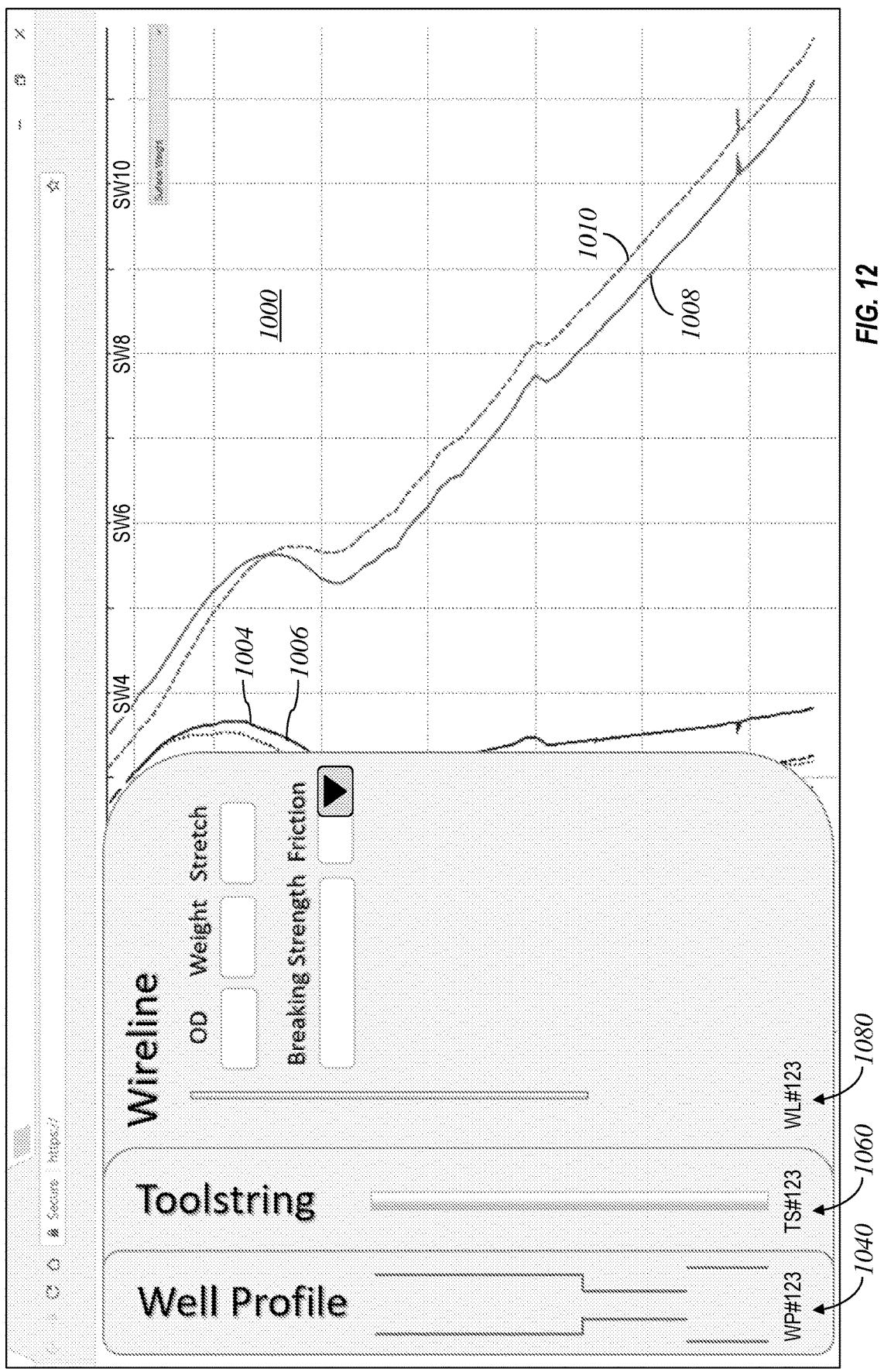

FIG. 12 depicts the wireline input area 1080 after expansion so that the user may enter text in an OD field 1082, a weight field 1084, a stretch field 1086, a breaking strength field 1088, and a friction reduction drop-down menu 1090. The wireline input area 1080 also includes a wireline identifier 1092.

The well profile identifier 1054, the toolstring identifier 1072, and/or the wireline identifier 1092 may be utilized to look up corresponding sets of inputs in associated libraries. Such means may also minimize input entry time.

If one of the input areas 1040, 1060, 1080 is expanded, and another of the input areas is selected for expansion, the currently expanded input area may automatically be collapsed. Selecting an expanded input area may collapse that input area. The graph area 1000 may remain present regardless of whether any of the input areas 1040, 1060, 1080 are expanded, and may be updated after each data entry is made or modified. Thus, the graph area 1000 may be visible while building and/or optimizing the project. The displayed graph can be changed between surface weight and cable head tension (if not also others) using a drop-down menu, a toggle, a slider, a button, and/or other selection means.

In the example depicted in FIGS. 9-12, the graph area 1000 is displaying surface weight versus depth. The curves include a curve 1002 depicting an initial set of inputs, a curve 1004 depicting a first modification of the inputs, and a curve 1006 depicting a second modification of the inputs. Another curve 1008 represents stretch for RIH, while curve 1010 represents stretch for POOH. Another curve 1012 represents jar firing force.

The output may be iterative, in that the user may adjust inputs to see changes in the results. Results may be automatically attached to the graph in their position until the user selects and deletes, so that a comparison can be seen between two options (toolstring types, conveyance assistance means, etc.). As inputs are changed and new results are added, the curve depicting the previous results line may change, such as in color, thickness, solid-dashed-dotted, etc.

When a tractor is indicated in the toolstring, the force required to reach depth may automatically be obtained, and that force may be applied to a predetermined length of the well for RIH, such as from 30 meters before the holdup depth to TD. When a jar is indicated in the toolstring, optimum settings for the jar may automatically be obtained (e.g., based on spreadsheet calculation or otherwise) using inputs already available in the simulation, and the firing line may be automatically displayed on the surface weight graph, perhaps with +/− tolerances determined previously, by the model, and/or otherwise.

TD may be assumed to be the end of the well. If the toolstring cannot reach the end of the well, TD may be automatically adjusted to hold-up depth, but may be reset anytime an input is changed.

Outputs may be screenshots of the results, perhaps with minimized inputs visible for reference, such as depicted in FIGS. 9-12.

User inputs and selections from menus may be saved in a database for later retrieval and re-running of simulations. If the product is web-based, usernames (e.g., email) and/or passwords may be utilized for access and record-keeping purposes, as well as for personal or public library purposes. Each project may be saved in a common database against that username/password, and all users may be able to access all projects, well profiles, toolstring profiles, and wireline profiles added by other users, perhaps referenced by project name and/or creator ID.

Given the above database functionality, a log-in screen will be used as a precursor to the user interface. After providing an approved username and/or password, the user may be asked to enter a name of their new project, or to select an existing project to retrieve from the database. If a previous project is selected and modified, the user may be asked to save or save-as upon closing the project.

Implementations of the above example may also support multiphase scenarios, more or fully automated analysis, and/or other options not explicitly described above.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
   a processing system comprising a processor and a memory storing a computer program code, wherein the processor executing the computer program code causes the processing system to:
      access past job input data comprising one or more of a past wireline input, a past toolstring input, a past well input, and a past conveyance input;
      generate a conveyance model of downhole conveyance operations based on the past job input data;
      access actual job input data comprising one or more of an actual wireline input, an actual toolstring input, an actual well input, and an actual conveyance input;
      predict job output data based on the conveyance model and the actual job input data, wherein the predicted job output data comprises one or more of a predicted surface weight versus depth output, a predicted cable head tension versus depth output, and a predicted jarring effect output; and
      generate control signals that cause surface equipment to convey a toolstring within a well based on the predicted job output data.

2. The apparatus of claim 1 wherein:
   the past job input data is indicative of a first operational parameter having a first value and a second operational parameter having a second value;
   the first operational parameter and the second operational parameter are correlated;
   the actual job input data is indicative of the second operational parameter having a third value; and
   the processor executing the computer program code also causes the processing system to predict a fourth value of the first operational parameter of the actual job input data based on the third value of the second operational parameter of the actual job input data, the first value of the first operational parameter of the past job input data, and the second value of the second operational parameter of the past job input data.

3. The apparatus of claim 1 wherein the processor executing the computer program code also causes the processing system to:
   access actual job output data comprising one or more of an actual surface weight versus depth output, an actual cable head tension versus depth output, and an actual jarring effect output;
   update the conveyance model based on a difference between the predicted job output data and the actual job output data; and
   predict the job output data based also on the updated conveyance model.

4. The apparatus of claim 1 wherein the past wireline input and the actual wireline input comprises information pertaining to one or more of:
   an outer diameter of a wireline for conveying the toolstring within the well;
   a weight of the wireline;

a coefficient of the wireline;
a breaking strength of the wireline;
a weak point of the wireline; and/or
a friction reduction means of the wireline.

5. The apparatus of claim 1 wherein the past toolstring input and the actual toolstring input comprises information pertaining to one or more of:
a length of the toolstring for conveying within the well;
an outer diameter of the toolstring;
a weight of the toolstring;
a friction reduction means of the toolstring;
a normal force applied to the toolstring;
a yield strength of the toolstring; and/or
a stroke length of a stroking component of the toolstring.

6. The apparatus of claim 1 wherein the past well input and the actual well input comprises information pertaining to one or more of:
a length of the well;
an inner diameter of the well;
a condition of the well;
a characteristic of fluid within the well;
a pressure within the well;
a temperature within the well;
a characteristic of production into and/or from the well;
a characteristic of one or more injections into the well; and/or
a characteristic of one or more reservoirs intersected by the well.

7. The apparatus of claim 1 wherein the past conveyance input and the actual conveyance input comprises information pertaining to one or more of:
a running speed of the toolstring conveyed within the well;
a pressure control friction pertaining to conveyance of the toolstring within the well;
a characteristic of production into and/or from the well; and/or
a characteristic of one or more injections into the well.

8. The apparatus of claim 1 wherein the predicted surface weight versus depth output and the actual surface weight versus depth output comprises information pertaining to one or more of:
a hold-up depth;
a variance of hold-up depth based on variation of rollers, standoffs, and/or other friction reduction means;
ajar surface weight;
a tractor force;
a maximum production;
a stick/slip pick-up; and/or
a variance of stick/slip pick-up based on variation of rollers, standoffs, and/or other friction reduction means.

9. The apparatus of claim 1 wherein the predicted cable head tension versus depth output and the actual cable head tension versus depth output comprises information pertaining to one or more of:
a quantified roller variance; and/or
an optimum jar setting.

10. The apparatus of claim 1 wherein the predicted jarring effect output and the actual jarring effect output comprises information pertaining to one or more of:
a distance; and/or
a number of jarring events.

11. The apparatus of claim 1 wherein the processor executing the computer program code also causes the processing system to:
access intermediary operational data; and
generate the conveyance model based also on the intermediary operational data.

12. The apparatus of claim 11 wherein access the intermediary operational data comprises generate the intermediary operational data based on the past job input data.

13. The apparatus of claim 11 wherein the processor executing the computer program code also causes the processing system to:
access actual job output data comprising one or more of an actual surface weight versus depth output, an actual cable head tension versus depth output, and an actual jarring effect output;
update the intermediary operational data based also on the actual job output data;
update the conveyance model based on the updated intermediary operational data; and
predict the job output data based also on the updated conveyance model.

14. The apparatus of claim 11 wherein the intermediary operational data comprises information pertaining to one or more of:
a friction factor;
a buoyancy;
a zero-friction surface weight;
a frictional drag;
a differential sticking; and/or
a jarring impact.

15. An apparatus comprising:
a processing system comprising a processor and a memory storing a computer program code, wherein the processor executing the computer program code causes the processing system to:
access past job input data comprising one or more of a past wireline input, a past toolstring input, a past well input, and a past conveyance input, wherein the past job input data is indicative of a first operational parameter having a value and a second operational parameter having a value, and wherein the first operational parameter and the second operational parameter are correlated;
generate a conveyance model of downhole conveyance operations based on the past job input data;
access actual job input data comprising one or more of an actual wireline input, an actual toolstring input, an actual well input, and an actual conveyance input, wherein the actual job input data is indicative of the second operational parameter having a value;
predict a value of the first operational parameter of the actual job input data based on the value of the second operational parameter of the actual job input data, the value of the first operational parameter of the past job input data, and the value of the second operational parameter of the past job input data;
predict job output data based on the conveyance model and the actual job input data, wherein the predicted job output data comprises one or more of a predicted surface weight versus depth output, a predicted cable head tension versus depth output, and a predicted jarring effect output; and
generate control signals that cause surface equipment to convey a toolstring within a well based on the predicted job output data.

16. The apparatus of claim 15 wherein the processor executing the computer program code also causes the processing system to:

access actual job output data comprising one or more of an actual surface weight versus depth output, an actual cable head tension versus depth output, and an actual jarring effect output;

update the conveyance model based on a difference between the predicted job output data and the actual job output data; and predict the job output data based also on the updated conveyance model.

17. The apparatus of claim 15 wherein the processor executing the computer program code also causes the processing system to:

access intermediary operational data; and generate the conveyance model based also on the intermediary operational data.

18. The apparatus of claim 17 wherein the processor executing the computer program code also causes the processing system to:

access actual job output data comprising one or more of an actual surface weight versus depth output, an actual cable head tension versus depth output, and an actual jarring effect output;

update the intermediary operational data based also on the actual job output data;

update the conveyance model based on the updated intermediary operational data; and predict the job output data based also on the updated conveyance model.

19. A method comprising:

initiating operation of a processing system such that the operating processing system:

accesses past job input data comprising one or more of a past wireline input, a past toolstring input, a past well input, and a past conveyance input;

generates a conveyance model of downhole conveyance operations based on the past job input data;

accesses actual job input data comprising one or more of an actual wireline input, an actual toolstring input, an actual well input, and an actual conveyance input; and predicts job output data based on the conveyance model and the actual job input data, wherein the predicted job output data comprises one or more of a predicted surface weight versus depth output, a predicted cable head tension versus depth output, and a predicted jarring effect output; and generates control signals that cause surface equipment to convey a toolstring within a well based on the predicted job output data.

20. The method of claim 19 wherein:

the past job input data is indicative of a first operational parameter having a value and a second operational parameter having a value;

the first operational parameter and the second operational parameter are correlated;

the actual job input data is indicative of the second operational parameter having a value; and the operating processing system also predicts a value of the first operational parameter of the actual job input data based on the value of the second operational parameter of the actual job input data, the value of the first operational parameter of the past job input data, and the value of the second operational parameter of the past job input data.

21. The method of claim 19 wherein the operating processing system also:

accesses actual job output data comprising one or more of an actual surface weight versus depth output, an actual cable head tension versus depth output, and an actual jarring effect output;

updates the conveyance model based on a difference between the predicted job output data and the actual job output data; and predicts the job output data based also on the updated conveyance model.

22. The method of claim 19 wherein the predicted surface weight versus depth output and the actual surface weight versus depth output comprises information pertaining to one or more of:

a hold-up depth;

a variance of hold-up depth based on variation of rollers, standoffs, and/or other friction reduction means;

a jar surface weight;

a tractor force;

a maximum production;

a stick/slip pick-up; and a variance of stick/slip pick-up based on variation of rollers, standoffs, and/or other friction reduction means.

23. The method of claim 19 wherein the predicted cable head tension versus depth and the actual cable head tension versus depth output comprises information pertaining to one or more of:

a quantified roller variance; and an optimum jar setting.

* * * * *